US012658004B2

(12) United States Patent
Nauman et al.

(10) Patent No.: US 12,658,004 B2
(45) Date of Patent: Jun. 16, 2026

(54) GAMING SYSTEMS AND METHODS WITH EXPANDABLE SYMBOL ACCUMULATION

(71) Applicant: LNW Gaming, Inc., Las Vegas, NV (US)

(72) Inventors: Jeffry Nauman, Yorkville, IL (US); Brett Grimes, Chicago, IL (US)

(73) Assignee: LNW Gaming, Inc., Las Vegas, NV (US)

( * ) Notice: Subject to any disclaimer, the term of this patent is extended or adjusted under 35 U.S.C. 154(b) by 273 days.

(21) Appl. No.: 18/464,415

(22) Filed: Sep. 11, 2023

(65) Prior Publication Data

US 2025/0087056 A1 Mar. 13, 2025

(51) Int. Cl.
*G07F 17/32* (2006.01)

(52) U.S. Cl.
CPC ...... *G07F 17/3267* (2013.01); *G07F 17/3213* (2013.01)

(58) Field of Classification Search
CPC ............. G07F 17/3267; G07F 17/3213; G07F 17/3244; G07F 17/34
See application file for complete search history.

(56) References Cited

U.S. PATENT DOCUMENTS 3,733,075 A 5/1973 Hooker et al.
4,198,052 A 4/1980 Gauselmann
4,200,291 A * 4/1980 Hooker .................. G07F 17/34 273/143 R
4,732,386 A 3/1988 Rayfiel
5,100,137 A 3/1992 Fulton
5,152,529 A 10/1992 Okada
5,205,555 A 4/1993 Hamano
5,342,047 A 8/1994 Heidel et al.
(Continued)

FOREIGN PATENT DOCUMENTS

AU 2013251288 A1 5/2014
AU 2014202042 A1 5/2014
(Continued)

OTHER PUBLICATIONS

Ancient Arcadia game brochure, Copyright 2011 IGT.
(Continued)

*Primary Examiner* — Chase E Leichliter

(57) ABSTRACT

A gaming system comprises a presentation assembly presenting a base set of symbol positions and game-logic circuitry that causes the presentation assembly to present, in response to a feature trigger event, an expanded set of symbol positions including a plurality of additional symbol positions within symbol position subsets, present feature game outcomes, lock, in response to any value-bearing symbols detected within the feature game outcomes, the value-bearing symbols within the expanded set of symbol positions. The game-logic circuitry initiates, in response to detecting a first subset reaching an award threshold of locked value-bearing symbols, an outcome counter, resets, in response to detecting a second subset reaching an award threshold, the outcome counter to a reset value, and causes, in response to the outcome counter reaching a termination value, the presentation assembly to conclude the feature game outcomes and present an award sequence for any awarding subsets.

22 Claims, 21 Drawing Sheets

(56) References Cited

U.S. PATENT DOCUMENTS 5,356,140 A 10/1994 Dabrowski et al.
5,393,061 A 2/1995 Manship et al.
5,395,111 A 3/1995 Inoue
5,431,408 A 7/1995 Adams
5,511,781 A 4/1996 Wood et al.
5,618,232 A 4/1997 Martin
5,695,188 A 12/1997 Ishibashi
5,704,835 A * 1/1998 Dietz, II ............. G07F 17/3265 463/20
5,722,891 A 3/1998 Inoue
5,752,881 A 5/1998 Inoue
5,766,074 A 6/1998 Cannon et al.
5,788,573 A 8/1998 Baerlocher et al.
5,807,177 A 9/1998 Takemoto et al.
5,810,665 A 9/1998 Takemoto et al.
5,833,537 A 11/1998 Barrie
5,848,932 A 12/1998 Adams
5,855,515 A 1/1999 Pease et al.
5,876,284 A 3/1999 Acres et al.
5,882,259 A 3/1999 Holmes, Jr. et al.
5,882,261 A 3/1999 Adams
5,890,962 A 4/1999 Takemoto
5,911,418 A 6/1999 Adams
5,927,714 A * 7/1999 Kaplan ................... G07F 17/34 463/20
5,947,820 A 9/1999 Morro et al.
5,951,397 A 9/1999 Dickinson
5,988,638 A 11/1999 Rodesch et al.
6,004,207 A 12/1999 Wilson, Jr. et al.
6,027,115 A 2/2000 Griswold et al.
6,033,307 A 3/2000 Vancura
6,048,269 A 4/2000 Burns et al.
6,050,895 A 4/2000 Luciano, Jr. et al.
6,056,642 A 5/2000 Bennett
6,089,976 A 7/2000 Schneider et al.
6,089,977 A * 7/2000 Bennett ................... G07F 17/34 463/20
6,102,798 A 8/2000 Bennett
6,120,031 A 9/2000 Adams
6,142,873 A 11/2000 Weiss et al.
6,159,097 A 12/2000 Gura
6,162,121 A 12/2000 Morro et al.
6,165,070 A * 12/2000 Nolte ...................... G07F 17/34 463/16
6,168,520 B1 1/2001 Baerlocher et al.
6,186,894 B1 * 2/2001 Mayeroff ................ G07F 17/34 463/16
6,203,429 B1 3/2001 Demar et al.
6,213,875 B1 4/2001 Suzuki
6,224,482 B1 5/2001 Bennett
6,224,483 B1 5/2001 Mayeroff
6,224,484 B1 5/2001 Okuda et al.
6,227,971 B1 5/2001 Weiss
6,241,607 B1 6/2001 Payne et al.
6,251,013 B1 6/2001 Bennett
6,270,411 B1 8/2001 Gura et al.
6,270,412 B1 * 8/2001 Crawford ............ G07F 17/3265 463/20
6,290,600 B1 * 9/2001 Glasson .............. G07F 17/3265 463/20
6,309,300 B1 10/2001 Glavich
6,315,663 B1 * 11/2001 Sakamoto ........... G07F 17/3265 463/20
6,319,124 B1 11/2001 Baerlocher et al.
6,375,567 B1 4/2002 Acres
6,375,570 B1 4/2002 Poole
6,413,162 B1 * 7/2002 Baerlocher ......... G07F 17/3211 463/20
6,481,713 B2 11/2002 Perrie et al.
6,517,432 B1 2/2003 Jaffe
6,537,150 B1 3/2003 Luciano et al.
6,544,120 B2 4/2003 Ainsworth
6,547,242 B1 4/2003 Sugiyama et al.
6,551,187 B1 4/2003 Jaffe
6,554,704 B2 4/2003 Nicastro et al.
6,558,254 B2 5/2003 Baelocher et al.
6,561,900 B1 * 5/2003 Baerlocher ............. G07F 17/34 463/20
6,561,904 B2 5/2003 Locke et al.
6,565,434 B1 5/2003 Acres
6,589,114 B2 * 7/2003 Rose ................... G07F 17/3265 463/20
6,641,477 B1 * 11/2003 Dietz, II ............. G07F 17/3265 463/16
6,652,378 B2 11/2003 Cannon et al.
6,656,040 B1 12/2003 Brosnan et al.
6,657,923 B2 12/2003 Laughlin
6,666,766 B2 * 12/2003 Baerlocher ......... G07F 17/3267 463/16
6,692,356 B2 2/2004 Baerlocher et al.
6,702,675 B2 3/2004 Poole et al.
6,731,313 B1 5/2004 Kaminkow
6,786,818 B1 9/2004 Rothschild et al.
6,832,957 B2 * 12/2004 Falconer ................. G07F 17/34 463/20
6,837,790 B1 1/2005 Kaminkow
6,869,360 B2 3/2005 Marks et al.
6,893,342 B1 * 5/2005 Singer ................. G07F 17/3262 463/20
6,896,617 B2 5/2005 Daly
6,910,962 B2 6/2005 Marks et al.
6,916,243 B2 7/2005 Yoshida
6,918,834 B2 7/2005 Vancura
6,926,609 B2 8/2005 Martin
6,942,571 B1 * 9/2005 McAllister .......... G07F 17/3209 463/20
6,960,134 B2 11/2005 Hartl et al.
7,018,293 B2 3/2006 Brown et al.
7,029,395 B1 4/2006 Baerlocher
7,029,396 B2 4/2006 Jaffe et al.
7,121,945 B2 10/2006 Suganuma et al.
7,147,559 B2 12/2006 Englman
7,156,740 B2 1/2007 Kaminkow
7,179,169 B2 2/2007 Beaulieu et al.
7,252,591 B2 8/2007 Van Asdale
7,316,613 B2 1/2008 Luccesi et al.
7,371,170 B2 5/2008 Cregan et al.
7,377,850 B2 5/2008 Shackelford et al.
7,431,646 B2 10/2008 Jackson
7,452,276 B2 11/2008 Loose et al.
7,458,890 B2 12/2008 Loose et al.
7,488,252 B2 2/2009 Griswold et al.
7,503,847 B2 3/2009 Baerlocher
7,526,736 B2 4/2009 Kaminkow et al.
7,553,231 B2 6/2009 Rodgers et al.
7,578,735 B2 8/2009 Frizzell et al.
7,601,062 B2 10/2009 Cole et al.
7,604,538 B2 10/2009 Pacey
7,618,319 B2 11/2009 Casey et al.
7,625,278 B2 12/2009 Paulsen et al.
7,654,895 B2 2/2010 Pacey
7,654,899 B2 2/2010 Durham et al.
7,674,176 B2 * 3/2010 Berman .................. G07F 17/34 463/16
7,690,985 B1 * 4/2010 Muskin ................... G07F 17/34 463/19
7,699,699 B2 4/2010 Gilliland et al.
7,704,141 B1 4/2010 Marks et al.
7,744,460 B2 6/2010 Walker et al.
7,785,191 B2 8/2010 Marks et al.
7,789,744 B2 9/2010 Fiden
7,841,934 B2 11/2010 Gauselmann
7,980,936 B2 7/2011 Mead
8,021,223 B2 9/2011 Rose
8,021,225 B2 9/2011 Okada
8,066,563 B1 11/2011 Schultz et al.
8,083,581 B2 12/2011 Marks et al.
8,105,145 B2 1/2012 Jaffe
8,105,151 B2 1/2012 Caputo et al.
8,113,940 B2 2/2012 Hornik
8,147,322 B2 4/2012 Walker et al.
8,162,740 B2 4/2012 Aoki

(56) References Cited

U.S. PATENT DOCUMENTS 8,162,741 B2 4/2012 Wadleigh et al.
8,192,275 B2 6/2012 Aoki et al.
8,246,442 B1 8/2012 Barrie
8,272,938 B2 9/2012 Gilmore et al.
8,287,357 B2 10/2012 Evans
8,323,091 B2 12/2012 Frank et al.
8,357,041 B1 1/2013 Saunders
8,360,851 B2 1/2013 Aoki et al.
8,366,538 B1 2/2013 Saunders et al.
8,371,930 B1 2/2013 Saunders et al.
8,388,432 B2 3/2013 Mattice et al.
8,414,380 B2 4/2013 Saunders et al.
8,435,110 B2 * 5/2013 Svanas .................... G07F 17/32 463/20
8,465,358 B2 6/2013 Kemper
8,496,522 B2 7/2013 Caputo et al.
8,512,121 B2 8/2013 Macvittie et al.
8,512,124 B2 8/2013 Bramble et al.
8,512,138 B2 8/2013 Saunders
8,523,659 B2 9/2013 Evans
8,574,059 B2 11/2013 Rodgers et al.
8,602,868 B2 12/2013 Johnson et al.
8,608,545 B2 12/2013 Arora et al.
8,662,986 B2 3/2014 Rodgers et al.
8,678,908 B2 3/2014 Nicely
8,690,660 B2 4/2014 Saunders et al.
8,696,434 B2 4/2014 Tsukahara
8,702,487 B2 4/2014 Thomas
8,790,169 B2 7/2014 Saunders
8,795,059 B2 8/2014 Aoki et al.
8,821,254 B2 9/2014 Tsukahara
8,834,258 B2 9/2014 Gobe et al.
8,851,974 B2 10/2014 Caputo et al.
8,870,642 B2 10/2014 Leupp et al.
8,882,578 B2 11/2014 Saunders
8,961,291 B2 2/2015 Dias Pires et al.
9,005,022 B2 4/2015 Saunders
9,011,233 B2 4/2015 Ryan
9,098,847 B2 8/2015 Basallo et al.
9,098,973 B2 8/2015 Basallo et al.
9,147,321 B2 9/2015 Moody
9,165,433 B2 * 10/2015 Caputo ............... G07F 17/3216
9,177,447 B2 11/2015 Zoltewicz et al.
9,202,345 B2 12/2015 Zoltewicz et al.
9,214,011 B2 12/2015 Wei et al.
9,230,410 B2 1/2016 Saunders et al.
9,245,421 B2 1/2016 Saunders et al.
9,251,667 B2 2/2016 Marks et al.
9,257,017 B2 2/2016 Saunders et al.
9,262,895 B2 2/2016 Rodgers et al.
9,576,423 B2 * 2/2017 Shai-Hee ............ G07F 17/3213
9,626,840 B2 * 4/2017 Williamson ............ G07F 17/34
9,666,033 B2 * 5/2017 Lathrop .................. G07F 17/32
9,805,553 B2 * 10/2017 Zielinski ............. G07F 17/3267
10,013,855 B2 7/2018 Nakamura
10,037,651 B2 7/2018 You et al.
10,043,350 B2 8/2018 Gomez et al.
10,062,237 B2 8/2018 Devine et al.
10,068,414 B2 * 9/2018 Shai-Hee ................ G07F 17/34
10,204,473 B2 2/2019 Lenger
10,242,533 B2 3/2019 Okada et al.
10,339,761 B2 7/2019 Olive
10,366,575 B2 7/2019 Visser
10,388,112 B2 8/2019 You et al.
10,410,472 B2 9/2019 Moody
10,417,877 B2 9/2019 Gomez et al.
10,475,294 B2 11/2019 Gomez et al.
10,497,203 B2 12/2019 Elmqvist
10,636,243 B1 * 4/2020 Davis .................. G07F 17/3213
10,672,220 B2 6/2020 Lenger
10,706,664 B2 7/2020 Boese et al.
10,726,676 B2 7/2020 You et al.
10,733,834 B1 * 8/2020 Hiten .................. G07F 17/3288
10,769,888 B2 9/2020 You et al.
10,839,648 B2 11/2020 Okada et al.
10,957,161 B2 3/2021 Chesworth et al.
11,017,638 B2 5/2021 Chesworth et al.
2001/0021666 A1 9/2001 Yoshida et al.
2002/0016200 A1 2/2002 Baerlocher et al.
2002/0045474 A1 * 4/2002 Singer ................. G07F 17/3216 463/20
2002/0119818 A1 8/2002 Savio et al.
2002/0155881 A1 10/2002 Yoshida
2002/0183105 A1 12/2002 Cannon et al.
2003/0017865 A1 1/2003 Beaulieu et al.
2003/0027619 A1 2/2003 Nicastro, Sr.
2003/0035346 A1 2/2003 Laughlin
2003/0060268 A1 * 3/2003 Falconer ................. G07F 17/34 463/20
2003/0064782 A1 4/2003 Beaulieu et al.
2003/0064783 A1 * 4/2003 Baerlocher ......... G07F 17/3244 463/20
2003/0064801 A1 4/2003 Breckner et al.
2003/0064802 A1 4/2003 Rodgers et al.
2003/0069063 A1 4/2003 Bilyeu et al.
2003/0125102 A1 * 7/2003 Cannon ................... G07F 17/34 463/20
2003/0130034 A1 7/2003 Suganuma et al.
2003/0157980 A1 8/2003 Loose et al.
2003/0216165 A1 11/2003 Singer et al.
2004/0012145 A1 1/2004 Inoue
2004/0023714 A1 2/2004 Asdale
2004/0043812 A1 * 3/2004 Ellis ........................ G07F 17/34 463/20
2004/0043815 A1 3/2004 Kaminkow
2004/0048646 A1 * 3/2004 Visocnik ................. G07F 17/32 463/16
2004/0092315 A1 5/2004 Boyd et al.
2004/0137982 A1 7/2004 Cuddy et al.
2004/0171417 A1 9/2004 Beaulieu et al.
2004/0198489 A1 10/2004 Kaminkow et al.
2005/0054414 A1 * 3/2005 Gauselmann ........... G07F 17/32 463/16
2005/0054442 A1 3/2005 Anderson et al.
2005/0059454 A1 * 3/2005 McComb ............ G07F 17/3213 463/16
2005/0119043 A1 * 6/2005 Berman .............. G07F 17/3211 463/20
2005/0130731 A1 6/2005 Englman et al.
2005/0143165 A1 * 6/2005 Berman .................. G07F 17/32 463/20
2005/0159208 A1 7/2005 Pacey
2006/0009286 A1 1/2006 Durham et al.
2006/0030387 A1 * 2/2006 Jackson .............. G07F 17/3211 463/16
2006/0063588 A1 3/2006 Poole
2006/0111173 A1 5/2006 Yang
2006/0142080 A1 6/2006 Enzminger
2006/0189369 A1 8/2006 Taylor
2006/0189379 A1 * 8/2006 Pacey ................. G07F 17/3267 463/20
2006/0205469 A1 9/2006 Schultz et al.
2006/0247002 A1 11/2006 Yoshimi et al.
2007/0060248 A1 3/2007 Rodgers et al.
2007/0060255 A1 3/2007 Baerlocher et al.
2007/0060275 A1 3/2007 Gilmore et al.
2007/0129135 A1 6/2007 Marks et al.
2007/0149267 A1 6/2007 Ross et al.
2007/0281784 A1 12/2007 Seelig et al.
2007/0287529 A1 12/2007 Kojima
2008/0003278 A1 1/2008 Mondelo
2008/0004532 A1 1/2008 Rubey et al.
2008/0032784 A1 2/2008 Englman
2008/0045298 A1 2/2008 Yoshizawa
2008/0045320 A1 2/2008 Kato
2008/0064466 A1 * 3/2008 Saito ....................... G07F 17/34 463/16
2008/0090636 A1 * 4/2008 Lathrop .................. G07F 17/34 463/20
2008/0108408 A1 5/2008 Wolf
2008/0108411 A1 5/2008 Jensen et al.
2008/0108422 A1 5/2008 Hedrick et al.
2008/0108431 A1 5/2008 Cuddy et al.

(56) References Cited

U.S. PATENT DOCUMENTS

2008/0132321 A1 6/2008 Pau
2008/0182647 A1 7/2008 Brunet De Courssou et al.
2008/0274789 A1 11/2008 Singer et al.
2009/0036208 A1 2/2009 Pennington et al.
2009/0156287 A1 6/2009 Baumgartner
2009/0181755 A1 7/2009 Gagner et al.
2009/0239634 A1 9/2009 Nguyen
2009/0247270 A1* 10/2009 Shai-Hee ............ G07F 17/3265 463/20
2009/0291741 A1 11/2009 Schofield
2010/0075737 A1 3/2010 Bluemel
2010/0113133 A1 5/2010 Leupp
2010/0167815 A1 7/2010 Gagner et al.
2010/0203948 A1 8/2010 Falciglia, Sr.
2010/0210343 A1 8/2010 Englman et al.
2010/0234092 A1 9/2010 Gomez et al.
2010/0304832 A1 12/2010 Kup-Ferroth
2011/0244943 A1 10/2011 Milford et al.
2011/0300937 A1 12/2011 Crowder, Jr. et al.
2012/0015707 A1 1/2012 Hornik et al.
2012/0077564 A1 3/2012 Collette et al.
2012/0094738 A1 4/2012 Aoki et al.
2012/0122532 A1 5/2012 Berman et al.
2012/0178517 A1 7/2012 Montenegro et al.
2012/0220360 A1 8/2012 Mcallister et al.
2013/0035150 A1* 2/2013 Owen ................. G07F 17/3265 463/20
2013/0065663 A1 3/2013 Johnson et al.
2013/0102375 A1 4/2013 Aoki et al.
2013/0260861 A1 10/2013 Vann et al.
2014/0014186 A1 1/2014 Bhattacharya et al.
2014/0024429 A1 1/2014 Aoki et al.
2014/0051496 A1 2/2014 Meyer
2014/0066162 A1* 3/2014 Basallo ............... G07F 17/3213 463/18
2014/0087832 A1* 3/2014 Zoltewicz ........... G07F 17/3213 463/20
2014/0141860 A1 5/2014 Meyer
2014/0179396 A1 6/2014 Aoki et al.
2014/0274292 A1 9/2014 Suda
2014/0323198 A1 10/2014 Tuck
2015/0031437 A1 1/2015 Gomez et al.
2015/0161853 A1* 6/2015 Ryan ....................... G07F 17/34 463/20
2015/0170462 A1 6/2015 Berman et al.
2015/0206386 A1 7/2015 Jaffe et al.
2015/0269809 A1 9/2015 Smith
2015/0287269 A1 10/2015 Berman
2015/0356833 A1 12/2015 Aoki et al.
2015/0379831 A1 12/2015 Lee et al.
2016/0042597 A1 2/2016 Olive
2016/0155303 A1 6/2016 Aoki et al.
2017/0154498 A1 6/2017 Olive
2017/0372558 A1 12/2017 You et al.
2018/0082547 A1* 3/2018 Lathrop .................. G07F 17/32
2018/0130303 A1 5/2018 Lamb
2018/0268655 A1 9/2018 Olive
2018/0268659 A1* 9/2018 Chesworth .......... G07F 17/3267
2019/0102992 A1 4/2019 You et al.
2019/0236905 A1 8/2019 Washington et al.
2019/0244481 A1* 8/2019 Jaffe ....................... G07F 17/34
2021/0049861 A1* 2/2021 Sahl .................... G07F 17/3267
2021/0366226 A1 11/2021 Cohn et al.
2021/0366227 A1 11/2021 Milosevich
2021/0366237 A1 11/2021 Bouvier et al.
2022/0028220 A1* 1/2022 Milosevich ......... G07F 17/3213
2022/0309866 A1* 9/2022 Peterson ............. G07F 17/3262
2023/0098777 A1* 3/2023 Cohn ...................... G07F 17/34 463/20
2023/0230440 A1* 7/2023 Jones .................... G07F 17/326 463/31
2023/0237877 A1* 7/2023 Sanborn ................ G07F 17/326 463/25
2023/0245528 A1* 8/2023 Bouvier .............. G07F 17/3225 463/20
2023/0419787 A1* 12/2023 Tsombanidis ........... G07F 17/34
2024/0054860 A1* 2/2024 Leggett ............... G07F 17/3213
2024/0119795 A1* 4/2024 Mariscal ............. G07F 17/3262
2024/0144770 A1* 5/2024 Colovic .............. G07F 17/3244
2024/0144771 A1* 5/2024 Turner ................ G07F 17/3267
2024/0242571 A1* 7/2024 Dale ................... G07F 17/3258
2024/0242572 A1* 7/2024 Dale ................... G07F 17/3213
2024/0304063 A1* 9/2024 Robards .............. G07F 17/3267
2025/0046144 A1* 2/2025 Albright ............. G07F 17/3211
2025/0087056 A1* 3/2025 Nauman ................. G07F 17/34
2025/0095443 A1* 3/2025 Hickox ................... G07F 17/34

FOREIGN PATENT DOCUMENTS

AU 2015210489 A1 2/2016
GB 2097160 A 10/1982
GB 2097160 B 5/1984
GB 2144568 A 3/1985
GB 2144568 B 9/1985
GB 2251112 A 6/1992

OTHER PUBLICATIONS

Flying Carpet game brochure, Copyright 2008 Bally.
Golden Knight game brochure, Copyright 2010 IGT.
Sultan of Mars game brochure, Copyright 2011 IGT.
The Amulet and the Charm game brochure, Copyright 2011 IGT.
Playboy Cash Wheel, SG Gaming Inc, retrieved from: https://www.sggaming.com/Games/SCIENTIFIC-GAMES/class3/premium-Games/playboy-cash-wheel-18515, 3 pages.

* cited by examiner

GAMING SYSTEMS AND METHODS WITH EXPANDABLE SYMBOL ACCUMULATION

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2023, LNW Gaming, Inc.

FIELD OF THE INVENTION

The present invention relates to a technological improvement to gaming systems, gaming machines, and methods and, more particularly, to new and improved animations in connection with a symbol accumulation feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to an embodiment of the present invention, there is provided a gaming system, gaming machine, and method that utilize a presentation assembly configured to present a base set of symbol positions selectively populated with randomly selected symbols within respective game outcomes, and game-logic circuitry in communication with the presentation assembly. The game-logic circuitry is configured to cause, in response to detecting a feature trigger event within a base game outcome, the presentation assembly to present an expanded set of symbol positions including the base set of symbol positions and a plurality of additional symbol positions within a plurality of symbol position subsets, cause the presentation assembly to present a plurality of feature game outcomes selectively including value-bearing symbols having award indicia that visibly indicate an award value associated with the respective value-bearing symbol, cause, in response to any value-bearing symbols detected within the plurality of feature game outcomes, the presentation assembly to lock the detected value-bearing symbols within the expanded set of symbol positions, initiate in response to detecting a first subset of the plurality of symbol position subsets reaching a respective award threshold of locked value-bearing symbols, an outcome counter, reset in response to subsequently detecting a second subset of the plurality of symbol position subsets reaching a respective award threshold of locked value-bearing symbols prior to the outcome counter reaching a termination value, the outcome counter to a reset value, and cause in response to the outcome counter reaching the termination value, the presentation assembly to conclude the plurality of feature game outcomes and present an award sequence for any awarding subsets of the plurality of symbol position subsets that reached the respective award thresholds, wherein an aggregated award of the award sequence is at least partially a function of the award values of the locked value-bearing symbols of the awarding subsets.

Additional aspects of the invention will be apparent to those of ordinary skill in the art in view of the detailed description of various embodiments, which is made with reference to the drawings, a brief description of which is provided below.

Figure 1:
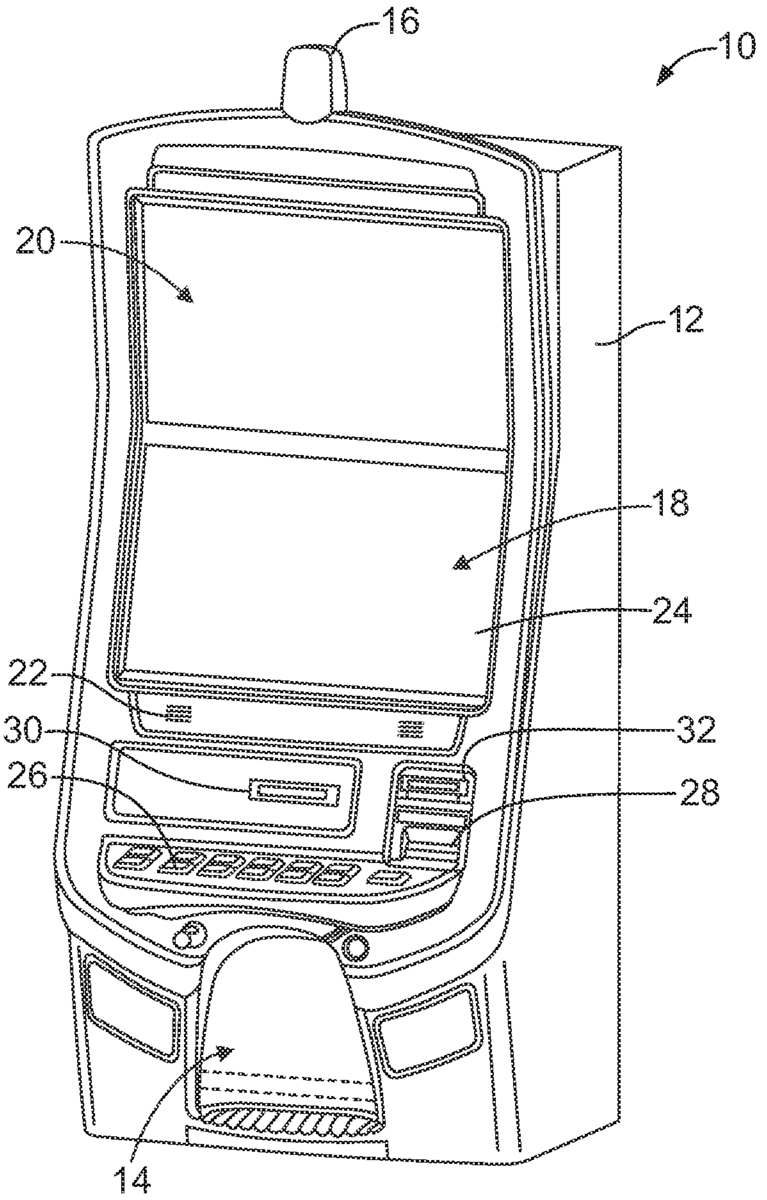
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Embodiments of the present invention comprise an innovative application of data processing steps that, when implemented by game-logic circuitry, direct an electronic display device to present a symbol-value accumulation process that minimizes processing overhead by utilizing numbered indicia to represent credit values instead of complex, fanciful game images. Further, the process aggregates displayed values borne by special symbols (i.e., value-bearing symbols) according to stored, variable criteria. In this way, the value-bearing symbols provide building blocks for innumerable different aggregation sequences simply by manipulating the aggregation criteria associated with the value-bearing symbols, resulting in fewer rules needed for the aggregation process than would be necessary for calculating values of winning symbol combinations enumerated in stored paytables, as found in prior art reel-spinning routines. At the same time, embodiments of the present invention provide a straightforward, what-you-see-is-what-you-get (WYSIWYG) visual presentation that is simple to understand and, therefore, effective in generating player excitement and enthusiasm. The result is a highly flexible value-aggregation process that can be easily adapted to any theme/brand while remaining easily understood by players.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical-reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are incorporated herein by reference in their entireties.

The presentation devices 18, 20, the audio speakers 22, lighting assemblies, and/or other devices associated with presentation are collectively referred to as a "presentation assembly" of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) 24 mounted over the primary or secondary presentation devices, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 102 (see FIGS. 3A and 3B). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 200 (see FIGS. 4-7), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
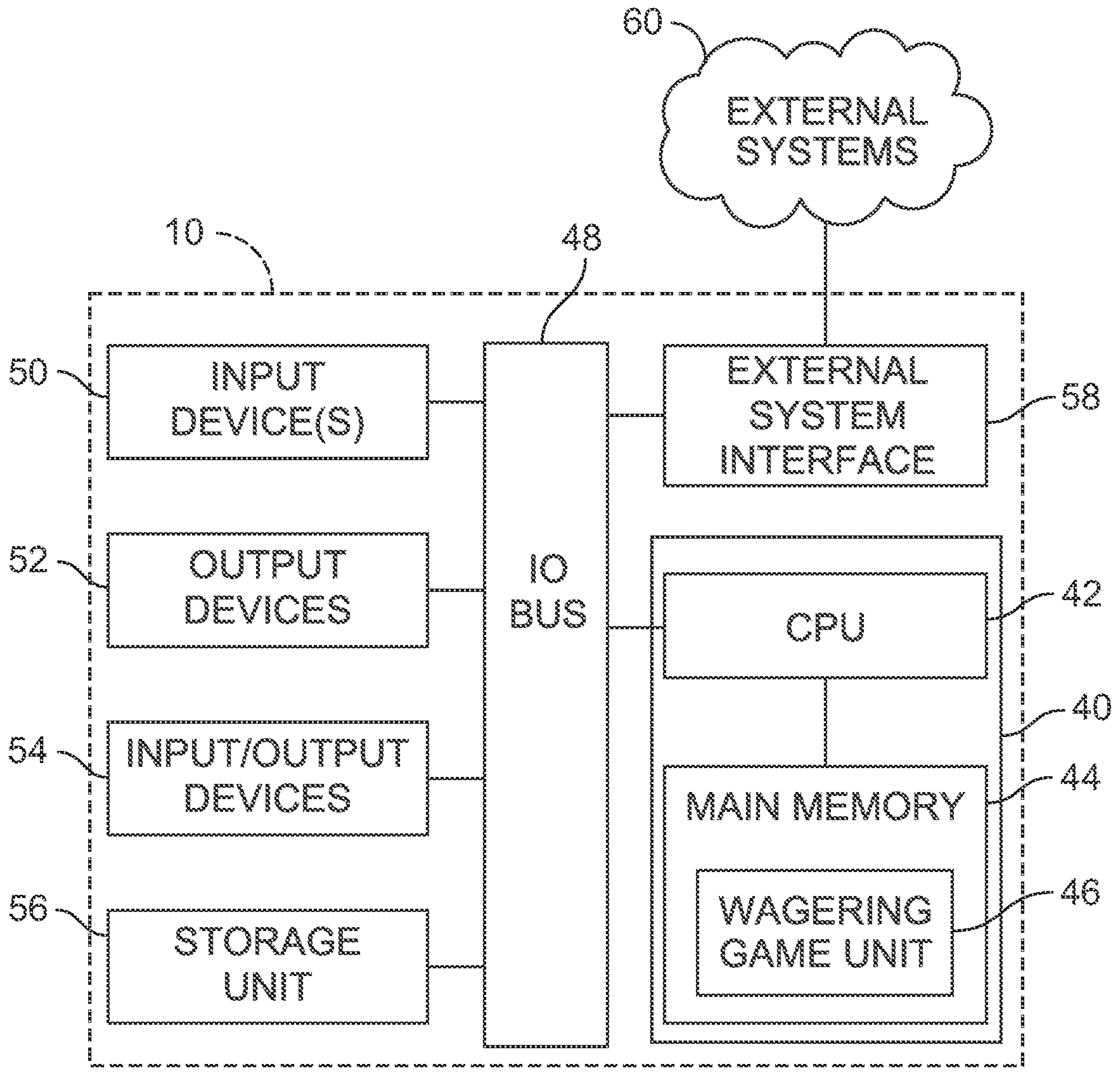
FIG. 2 is a block diagram of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in or are used in other gaming jurisdictions, including for example GLI Standard #11 of Gaming Laboratories International (which defines a gaming device in Section 1.5) and N.J.S.A 5:12-23, 5:12-45, and all other relevant provisions of the New Jersey Casino Control Act. As can be seen from the description herein, the gaming machine 10 may be implemented with hardware and software architectures, circuitry, and other special features that differentiate it from general-purpose computers (e.g., desktop PCs, laptops, and tablets).

Figure 3A:
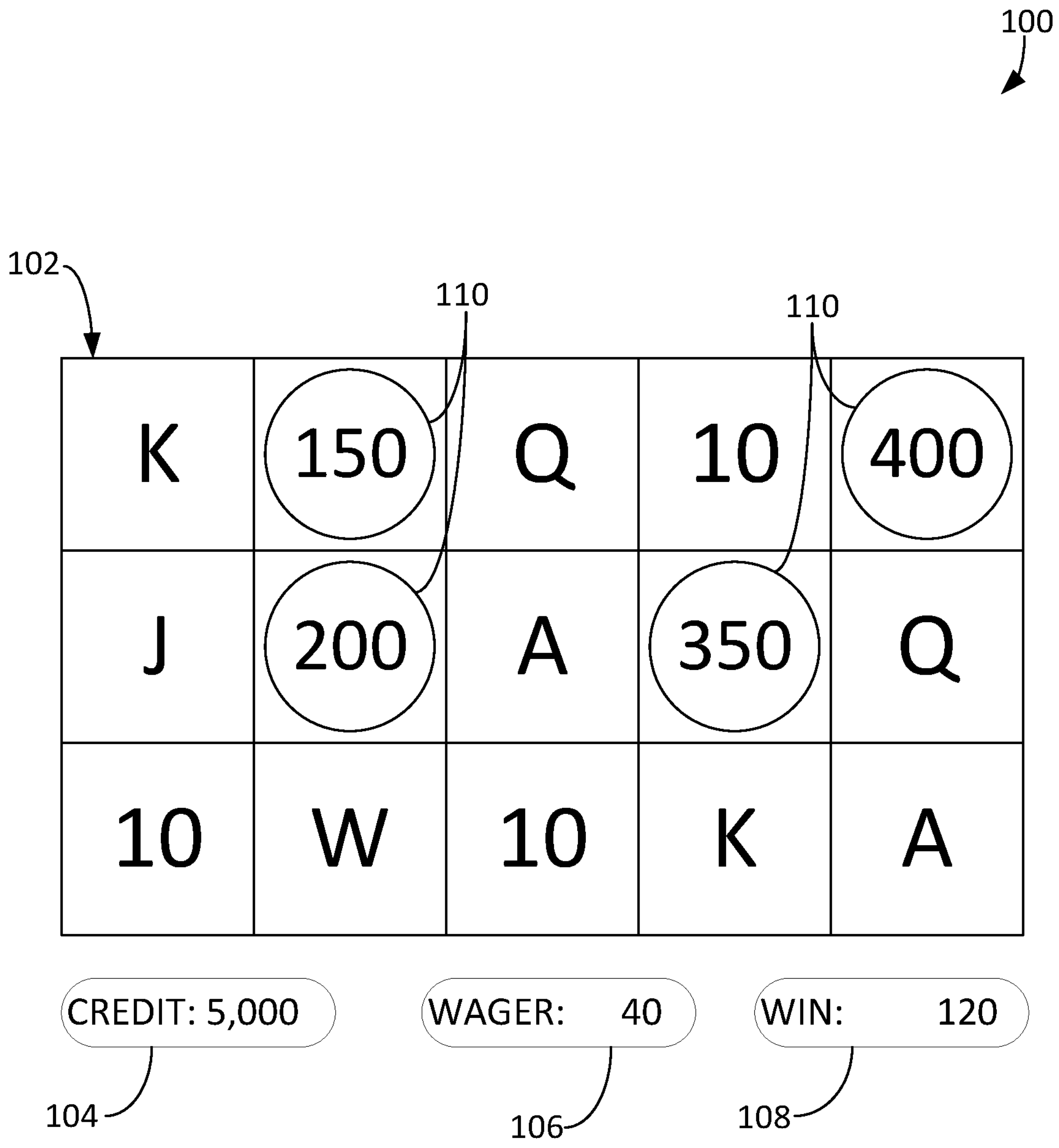
FIG. 3A is an example game interface for a game including a base array and value-bearing symbols, according to an embodiment of the present invention.
Figure 3B:
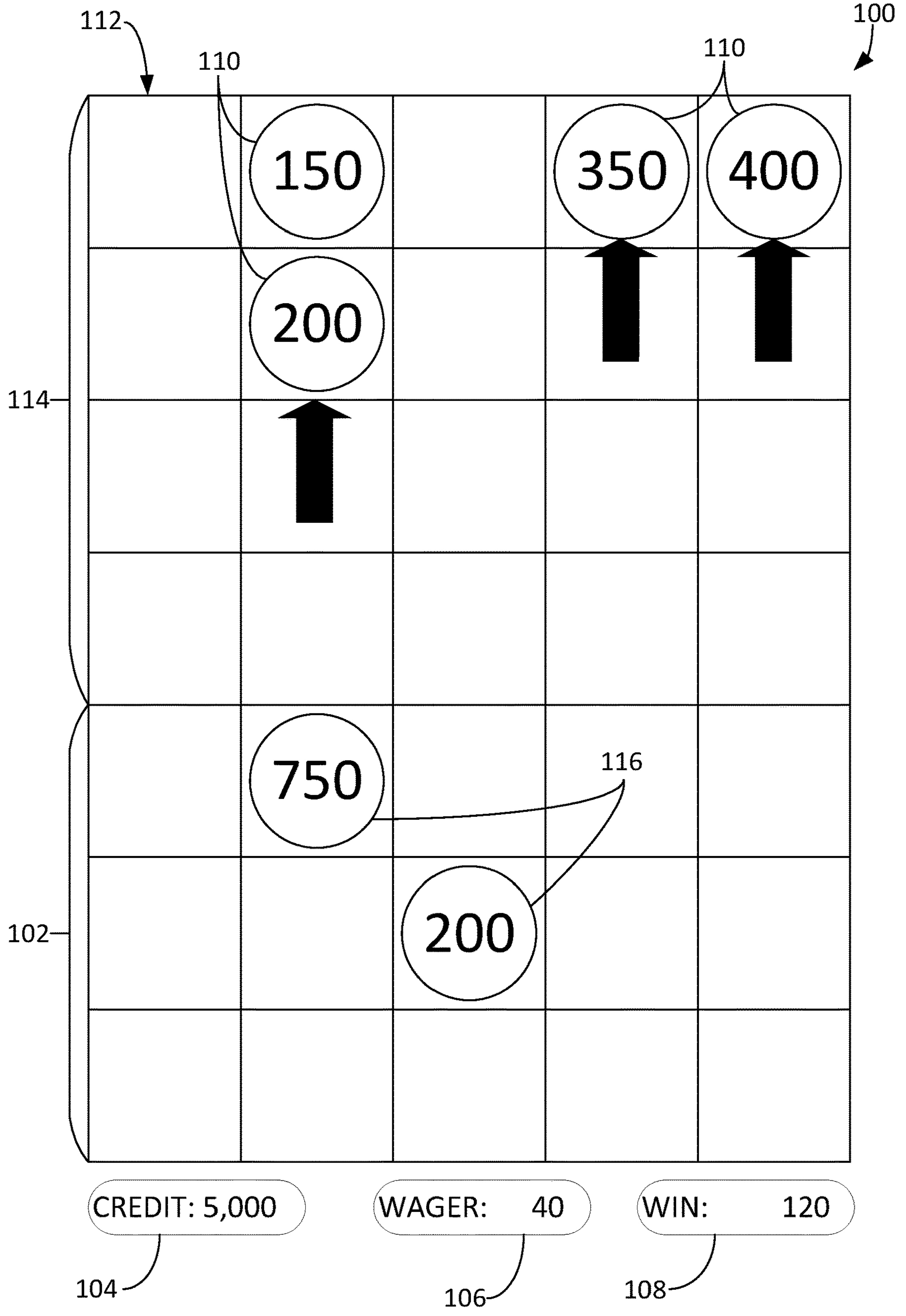
FIG. 3B is the game interface of FIG. 3A with an expanded set of symbol positions and locked value-bearing symbols, according to an embodiment of the present invention.

FIGS. 3A and 3B depict an example game interface 100 of an exemplary game according to one or more embodiments of the present disclosure. In the example embodiment, the game includes a base game feature and a bonus game feature as described herein. The game interface 100 is presented by a presentation assembly of a gaming machine (e.g., the machine shown in FIGS. 1 and 2). The interface 100 may be presented via a single display device (electronic, mechanical, or electromechanical) or a plurality of display devices such that elements of the interface 100 may be divided between display devices (e.g., meters may be presented on a different display device from a symbol array). In other embodiments, the interface 100 may include additional, fewer, or alternative presentation elements and/or game elements, including those described elsewhere herein.

FIG. 3A depicts the game interface 100 within the base game feature. More specifically, the interface 100 in the base game feature includes a base symbol array 102, a credit meter 104, a bet meter 106, and a win meter 108. The symbol array 102 includes a plurality of symbol positions organized into a plurality of rows and columns. In other embodiments, the symbol positions may be organized into a different configuration to facilitate particular game conditions, trigger or award events, and the like. For example, the symbol array 102 may include a different number of rows and/or columns, or the array 102 may include rows and/or columns having a different number of symbol positions relative to the other rows or columns. In another example, the symbol positions may be arranged into a plurality of base symbol arrays 102.

The meters 104, 106, and 108 are presented within the interface 100 to enable a player to monitor changes to the player's credit balance within a gaming session including the exemplary game. In particular, the credit meter 104 visually indicates the credit balance of the player for the gaming session, the bet meter 106 visually indicates the last or current wager placed by the player, and the win meter 108 visually indicates awards based on game outcomes of the game. The presentation assembly is configured to visually update the meters 104, 106, and 108 to enable the player to readily understand the impact of the game events and conditions on the credit balance of the player. For example, wagers may be subtracted from the credit meter 104 to the bet meter 106, and awards are initially indicated on the win meter 108 before the value is applied to the credit meter 104. Other suitable configurations of meters, including additional, fewer, or alternative meters, may be used. In one example, a single graphical element on the interface 100 may include a plurality of subelements, where each subelement is visually distinct from other subelements and associated with a particular type of meter. For example, a single graphical meter may include different colored meter fills and/or text to represent each of the meters 104, 106, and 108 within a single graphical element.

In the example embodiment, the base symbol array 102 is configured to be selectively populated with randomly selected symbols. The randomly selected symbols are selected from one or more sets of available symbols. In one example, each set of available symbols represents a symbol-bearing reel strip, and each reel strip is associated with one or more symbol positions of the array 102 (e.g., a single symbol position or an entire column of the array 102. The random selection of the symbols is based at least in part on one or more random values or determinations that are compared to the available sets. In at least some embodiments, the available sets of symbols are defined within one or more weighted tables, where each available symbol is associated with one or more possible values (or outcomes) of the random determination or other suitable from of weighted parameters. If a random value is generated (e.g., by a random number generator of the game-logic circuitry), the value is compared to the weighted tables. Based on the comparison, one of the symbols (or a reel stop position) is selected for the game outcome. This random determination may be performed for each symbol position or reel strip, or the random determination may be compared to each weighted table to select the symbols for every symbol position. It is to be understood that the symbols, in addition to those described and shown herein, may include "blanks," where the symbol position appears visually empty and/or "inactive symbols" that do not affect the game outcome. Inactive symbols and blanks may be visually distinctive from "active symbols" used to determine game outcomes, such as the active symbols shown in FIG. 3A.

As described herein, the presentation assembly is configured to perform one or more animations to visually indicate a base game outcome. In one example, a spin animation may be used to cycle through the sets of available symbols before stopping on the symbols forming the game outcome. The game-logic circuitry is configured to perform one or more outcome determinations based on the symbols occupying the symbol array 102, which may include detecting winning symbol combinations, trigger events, and the like. In certain embodiments, the game may include some form of persistence between game outcomes, and the game-logic circuitry may store one or more values, state parameters, and the like to track or monitor the persistent aspects of the game. In response to the game outcome determinations, the game-logic circuitry causes the presentation assembly to selective present any corresponding presentation sequences. For example, if a winning symbol combination is detected, the game-logic circuitry causes the presentation assembly to present an award sequence for an award associated with the winning symbol combination (e.g., visually updated the win meter 108 and subsequently the credit meter 106).

In the example embodiment, one or more sets of available symbols include trigger symbols for triggering a bonus game feature. That is, a trigger event associated with the bonus game feature is based at least partially on the trigger symbols within one or more game outcomes. The trigger event is available within the base game feature to facilitate the transition from base game feature to bonus game feature as described herein. In one example, the trigger event includes a predefined number of trigger symbols populating the symbol array 102 within a single base game outcome (e.g., three or more trigger symbols). In another example, the trigger event includes a predefined number of trigger symbols populating the symbol array 102 within a set of base game outcomes (e.g., twenty trigger symbols over ten game outcomes). In certain embodiments, additional or alternative trigger events are available that do not include the trigger symbols.

In the example embodiment, the trigger symbols are value-bearing symbols 110 shown in FIG. 3A. Value-bearing symbols are symbols that include award indicia that visually indicate an award associated with the symbol. The award may be an award value, a game enhancement, and the like (e.g., a number of free spins). The award indicia may be selectively hidden and revealed through the gameplay described herein. In some embodiments, at least some of the value-bearing symbols may not be trigger symbols and/or other symbols may be trigger symbols. In certain embodiments, a plurality of types of trigger events are available, and the corresponding trigger symbols may be visually distinct from trigger symbols associated with other types of trigger events.

In the illustrated embodiment, a trigger event is detected based on the value-bearing symbols 110. In response to the trigger event, the game-logic circuitry initiates a bonus game feature and causes the presentation assembly to update the game interface 100 from a base game interface to a bonus game interface. The updates to the interface 100 may include one or more animations, added presentation elements, changes to preexisting presentation elements, and/or other suitable changes to the presentation of the interface 100. FIG. 3B depicts the game interface 100 in a bonus game state.

More specifically, the bonus game interface 100 of FIG. 3B includes an expanded symbol array 112. The expanded symbol array 112 includes the base symbol array 102 and a plurality of additional symbol positions 114. In the illustrated embodiment, the presentation assembly is configured to present the expanded symbol array 112 by "expanding" the columns of the base symbol array 102. Other suitable presentation sequences and/or configurations of the expanded symbol array 112 may be used in other embodiments. In one example, instead of a single expanded symbol array 112, the bonus game feature may include a plurality of symbol arrays or other independent symbol position groups. In another example, each column expands independently of other columns such that each column may include a different number of symbol positions. In a further example, the symbol array expands in other directions from the base symbol array 102 (e.g., downward, sideways, or combinations thereof). In certain embodiments, the additional symbol positions 114 may be visually distinct from the base symbol array 102.

In addition to the array expansion, the bonus game feature includes a symbol-locking aspect for triggering awards. More specifically, the value-bearing symbols 110 are locked to the top of the expanded symbol array 112, and the number of locked symbols is compared to an award threshold to determine whether or not an award event is active. In at least some embodiments, the expanded symbol array 112 is divided into a plurality of symbol position subsets, and each subset is associated with a respective one or more award events. The subsets may include symbol positions of the base symbol array 102, the additional symbol positions 114, or combinations thereof. In the example embodiment, the subsets are respective columns of the expanded symbol array 112, and therefore include both symbol positions of the base symbol array 102 and the additional symbol positions 114 for a given column. In other embodiments, other suitable subsets of symbol positions (including subsets comprising a single symbol position) may be used. In one example, the symbol positions of the expanded array 112 include background colors, watermarks, and/or the like that visually indicate the subsets, thereby facilitating subsets that are not positionally grouped together within the array 112. In certain embodiments, the subsets may be dynamic and responsive to random determinations and/or events or conditions detected within the gaming session (e.g., award events, certain symbols, wager frequency or amount, player input, etc.).

In the example embodiment, for each column occupied with a value-bearing symbol 110 from FIG. 3A, the symbols 110 are moved upwards to the next unoccupied symbol position of the column and locked in place for the bonus game feature. As used herein, "locked symbols" or "locking symbols" refers to maintaining a symbol with the array 112 for a persistent duration, if the duration extends beyond the current game outcome, then the locked symbol persists for a plurality of game outcomes in the array 112. The locked state may be visually indicated to the player through the presence or absence of certain presentation elements and/or presentation sequences or changes to the visual appearance of the symbol. For example, the locked symbols may remain fixed while a spinning animation is performed for a subsequent game outcome. The duration of the locked symbols may span a plurality of game outcomes, and example durations are described herein. At the conclusion of the duration (or in response to certain game events, such as award events associated with the locked symbols), the locked symbols are transitioned from a locked state to an unlocked state such that the previously locked symbols may be removed from the array 112.

In the example embodiment, the value-bearing symbols 110 are locked within the subset in which each respective symbol 110 lands within during a game outcome. Other symbols, such as modifier symbols that affect one or more award values, may also be locked in the array 112. The symbols are moved to the next available symbol position at the top of the subset. That is, if no locked symbols are present in a column, the value-bearing symbol 110 is moved up to the very top position of the column. If the top position is occupied by a locked symbol, the value-bearing symbol 110 is locked in the next-highest position of the column. FIG. 3B depicts an example of this locking sequence, where the value-bearing symbols 110 from FIG. 3A are moved to the top of the respective columns to be locked in place for one or more subsequent bonus game outcomes. Other suitable locking sequences, such as locking the symbols at the bottom of the column or reorganizing the locked symbols by award value, may be used in other embodiments.

In the example embodiment, game outcomes of the bonus game feature include selectively populating the base symbol array 102 with symbols, particularly value-bearing symbols and/or other suitable lockable symbols. That is, in the example bonus game feature, the base symbol array 102 is configured to selectively include new symbols from the game outcomes and hold locked symbols, while the additional symbol positions 114 are dedicated to holding locked symbols. As shown in FIG. 3B, two new value-bearing symbols 116 are present in the base symbol array 102, which are subsequently locked to the array in a manner similar to the value-bearing symbols 110 (i.e., locked to the next available position at the top of the respective column). In other embodiments, the base symbol array 102 and the additional symbol positions 114 are configured to operate similar to each other such that new symbols can be present in the additional symbol positions 114 as well. In further embodiments, the base symbol array 102 is limited to new symbol generation and presentation without holding locked symbols. Other suitable configurations of the symbol positions within the expanded symbol array 112, including functions divided in a manner other than between the base symbol array 102 and the additional symbol positions 114, may be used.

In the example embodiment, the locked symbols are associated with one or more award sequences of the bonus game feature. More specifically, an award event for each column is triggered by reaching or exceeding an award threshold number of locked symbols. In one example, the award threshold fills the entire column with locked symbols. In another example, the award threshold is set to an amount less than the number of symbol positions within a given subset. In embodiments with the award threshold being different than the number of symbol positions within a subset, the award threshold may be visually indicated to the player to monitor progress towards the award event (e.g., a background or watermark at the symbol position associated with the threshold).

In the example embodiment, the award event for a given column results in an award sequence presented by the presentation assembly for an award at least partially a function of the award values indicated by the locked value-bearing symbols within the column. In one example, the award values of the locked value-bearing symbols are aggregated together and provided as an award for the award sequence. The award sequence includes one or more presentation elements, animations, and/or other suitable audio-visual elements to indicate an award to the player. For example, the win meter 108 is visually updated with the value of the award, and then the credit meter 104 is subsequently visually updated to include the value indicated by the win meter 108.

The bonus game feature is configured to facilitate a plurality, one, or no award events prior to the conclusion of the bonus game feature. In certain embodiments, the bonus game feature may be guaranteed to provide at least one award event. That is, the limited duration of the bonus game feature is defined in response to an initial award event being triggered. In one example, in response to a first column reaching the award threshold of locked symbols, the game-logic circuitry initiates a game outcome counter at an initial value. As subsequent game outcomes are generated and presented for the bonus game feature, the game outcome counter is updated. If the game outcome counter reaches a termination count (e.g., zero for a decrementing counter), the bonus game feature is concluded and the award sequences for any awarding subsets (i.e., columns that reached the award threshold or associated with an award event) are presented. In some embodiments, the counter is updated irrespective of events or conditions within the bonus game outcomes. In other embodiments, the counter may be dynamic and reset or otherwise change responsive to certain game events or conditions. For example, subsequent award events may reset the counter to the initial value or another suitable reset value.

In the example embodiment, at the conclusion of the bonus game feature, at least a portion of the award sequences for the awarding subsets are presented. That is, in some embodiments, a portion of the award sequence may be presented at the detection of the corresponding award event and another portion is held until the end of the bonus game feature to be incorporated with the award sequences of other subsets. In other embodiments, the award sequences of each subset are independent of each other and may be presented immediately following the presentation of the award event. Other suitable award sequences, including hybrid sequences incorporating a plurality of award sequences, may be used. The game interface 100 may then be transitioned back to a base game interface for play of the base game feature (or to the interface of another game feature). For example, the locked symbols are removed and the expanded symbol array 112 transitions back to the base symbol array 102 (i.e., the additional symbol positions 114 are removed from the interface 100).

Figure 4:
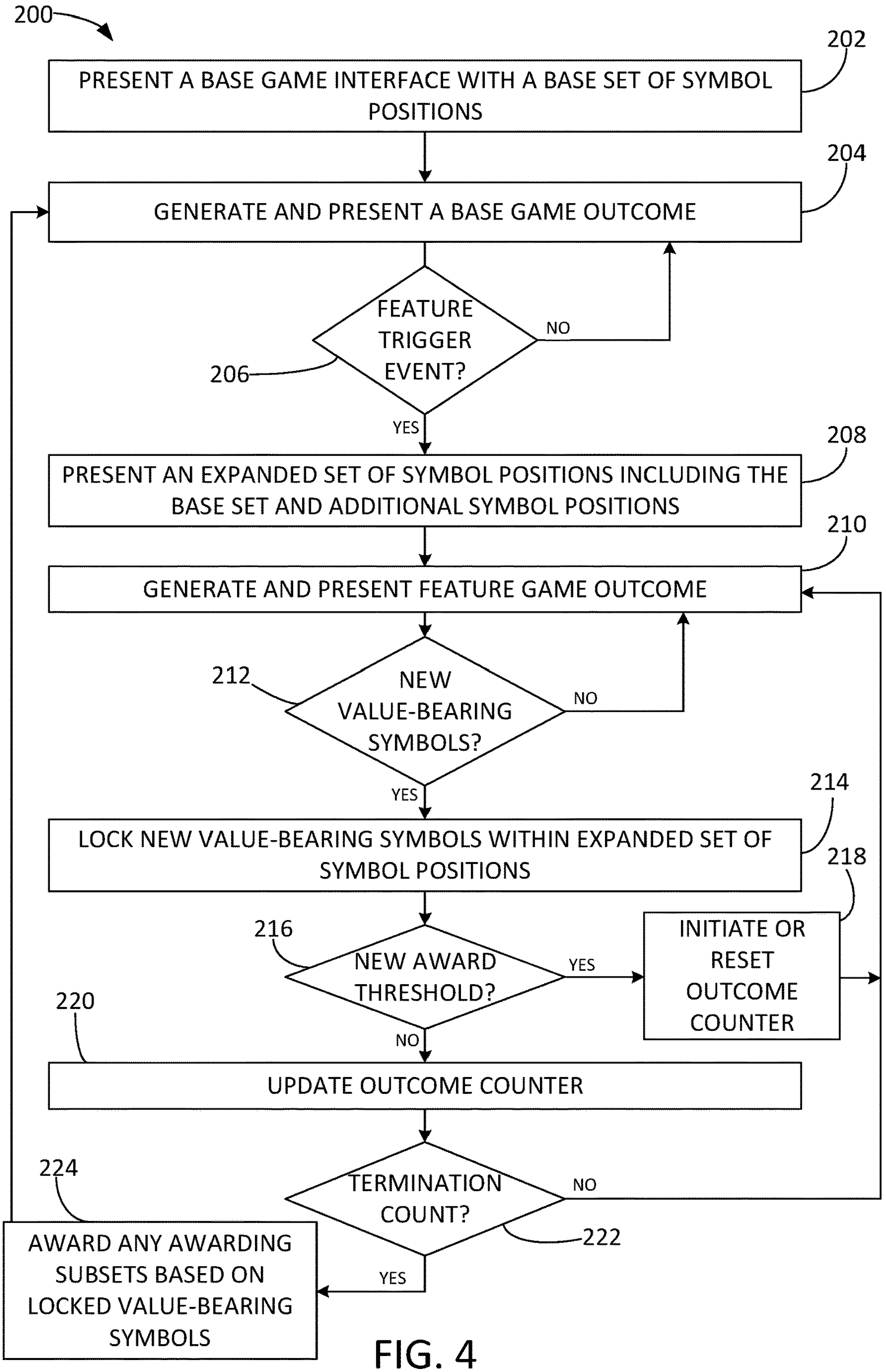
FIG. 4 is a flow diagram of an example method of operating a gaming machine using game-logic circuitry in communication with a presentation assembly of the gaming machine, according to an embodiment of the present invention.

FIG. 4 depicts a flow diagram of an example method 200 for operating a gaming machine using a gaming system (e.g., the system shown in FIGS. 1 and 2). The gaming system includes a gaming machine with a presentation assembly in communication with game-logic circuitry. The game-logic circuitry may be integrated within the gaming machine, independent from the gaming machine (i.e., the logic circuitry is in data communication with the gaming machine, or combinations thereof. For example, game outcomes may be generated from a portion of the game-logic circuitry within a gaming server and communicates the game outcomes to the gaming machines, where another portion of the game-logic circuitry within the gaming machine facilitates the associated presentation sequences. In other embodiments, the method 200 may include additional, fewer, or alternative steps and/or is performed other suitable devices or subsystems, including those steps and devices described elsewhere herein.

The method 200 is associated with a game including a base game and a feature game. In the example embodiment, the base game and feature game include a plurality of symbol positions that are selectively occupied by symbols randomly selected from one or more sets of available symbols. In other embodiments, the base game and/or the feature game include additional or alternative game elements to facilitate the game functionality described herein. In one example, the base game and/or the feature game include symbol-bearing wheels, where symbols are selected from the wheel for generating game outcomes.

At step 202, the game-logic circuitry causes the presentation assembly to present a base game interface associated with the base game. In particular, the base game interface includes a base set of symbol positions, which may be arranged into one or more symbol arrays. The step 202 may be performed in response to a player initiating a gaming session at the gaming machine and/or establishing a credit balance for play of the game. The credit balance is established by providing a credit input to the gaming machine (or a server in communication with the gaming machine). The credit input may be one or more physical items provided to a corresponding credit input device (e.g., tickets, bills, coins, cards, etc.) or a digital input received from a digital wallet or other account associated with the player.

In response to presenting the base game interface, play of the base game is initiated. At step 204, the game-logic circuitry generates a game outcome and causes the presentation assembly to present the game outcome. Generating the game outcome may include, for example, one or more random determinations (e.g., generating random values using a random number generator of the game-logic circuitry) and comparing the random determinations to the one or more sets of available symbols, reel stop positions, and the like to select the symbols forming the game outcome. In one example, the base set of symbol positions are associated with a plurality of symbol-bearing reel strips, and each reel strip is associated with a weighted table of reel stop positions. In such an example, each of the weight parameters are associated with a unique range of possible random values, and the random value generated by the game-logic circuitry is compared to the weight parameters. The reel stop position associated with the weight parameter matching or including the generated random value is selected for the game outcome. Other suitable processes for random selection of symbols, reel stop positions, and the like may be used in other embodiments.

The presentation assembly is configured to present one or more game outcome sequences associated with the generated game outcome. In one example, the symbol-bearing reel strips are animated to spin and eventually stop on the symbols forming the generated outcome. Other suitable presentation sequences according to the configuration, theme, and the like of the game may be used to visually indicate to the generation of a game outcome.

In response to generating the game outcome, the game-logic circuitry is configured to perform one or more outcome determinations. The outcome determinations include analyzing the symbols of the outcome with one or more predefined parameters, random determinations, parameters associated with the current state of the game, and the like. For example, the game-logic circuitry stores a plurality of winning symbol combinations that are compared to the symbols of the game outcome to determine if a winning outcome is present. If one or more winning symbol combinations are present in the game outcome, the game-logic circuitry retrieves and/or calculates a corresponding award. The award is provided to the credit balance of the player and visually conveyed to the player through an award sequence presented by the presentation assembly.

Additional outcome determinations may be performed by the game-logic circuitry to facilitate a particular configuration of the game, such as determining whether or not a particular game event is present in the outcome. The additional outcome determinations may be performed sequentially, in parallel, and/or other suitable arrangements relative to each other and other services of the game-logic circuitry. An example outcome determination is shown at step 206. At step 206, the game-logic circuitry is configured to perform an outcome determination associated with the feature game. In particular, the game-logic circuitry is configured to determine whether a feature trigger event is present and/or active within the game outcome of the base game.

In the example embodiment, the feature trigger event includes at least a predefined number of trigger symbols within the game outcome. In the analysis of the game outcome symbols, the game-logic circuitry counts the current number of trigger symbols and compares the count to a stored threshold count. Based on the comparison, the game-logic circuitry determines if the trigger event occurred and responds accordingly. In the illustrated embodiment, if no trigger event is detected, the game-logic circuitry continues within the base game and awaits a subsequent base game outcome at step 202. If a trigger event is detected, the feature game is initiated and the method 200 proceeds to step 208 as described herein.

The trigger symbols are presented in a manner to visually distinguish from other symbols. In some embodiments, within the base game, the trigger symbols are only used to trigger the feature game. In other embodiments, the trigger symbols include additional functionality within the base game. In one example, the trigger symbols act as wild symbols in the base game. In another example, the trigger symbols share functionality with at least one non-trigger symbol, such as standard slot-game symbols (e.g., the trigger symbols include a cherry symbol, and the base game includes non-trigger cherry symbols). The trigger symbols may be visually distinguishable from the non-trigger symbol counterparts. For example, the color, design, border, animation, and the like of a particular symbol type may be different between the trigger and non-trigger variants.

In certain embodiments, the trigger symbols are value-bearing symbols that include award indicia. The award indicia visually indicates an award value associated with the value-bearing symbol, which is awarded at least through the steps of the feature game described herein. In at least one embodiment, the award of a value-bearing symbol may be collectable within the base game as well, and the game-logic circuitry is configurable to define the parameters to detect the corresponding award event in base game outcomes. In some embodiments, non-trigger value-bearing symbols may be present within the base game. In such embodiments, the non-trigger value-bearing symbols may be removed at the initiation of the feature game or carried through to the feature game similar to the trigger symbols as described herein.

Following step 206 indicating a feature trigger event is present within the base game outcome, the game-logic circuitry causes the presentation assembly to transition from a base game interface to a feature game interface to visually indicate the game transition to the player. In particular, at step 208, the presentation assembly presents an expanded set of symbol positions including the base set from the base game and one or more additional symbol positions. In some embodiments, the expanded set of symbol positions form a single expanded symbol array including a base symbol array from the base game and additional symbol positions. For example, the expanded symbol array may be presented by the presentation assembly by animating the base symbol array to 'grow' or otherwise expand to include the additional symbol positions, which may be presented as additional rows and/or columns of the array. In other embodiments, other suitable configurations of the expanded set of symbol positions may be used, including configurations with a plurality of independent groups of symbol positions.

In the example embodiment, the expanded set of symbol positions is divided into a plurality of position subsets. In at least some embodiments, each subset includes at least one symbol position of the base set and at least one additional symbol position. In other embodiments, the subsets are formed irrespective of the base set and the additional symbol positions. In one or more examples, the subsets are rows and/or columns of an expanded symbol array defined by the expanded set of symbol positions. Each position may be included in a unique subset, or the position may be included in multiple subsets (e.g., overlapping subsets). As described in detail below, each subset is associated with at least one award condition, which is monitored through the feature game to determine if any subset awards are to be provided.

In some embodiments, the base set of symbol positions and the additional symbol positions are visually and/or functionally distinct from each other. In one example, as described in detail below, both the base set and additional symbol positions are configured to hold locked symbols, but only the base set of symbol positions is configured to include new symbols from a feature game outcome. The visual distinction (e.g., different graphical elements, animations, and the like) between the base set and the additional symbol positions may be used to facilitate a player readily understanding the functional difference between the symbol positions. In other embodiments, the base set and additional symbols look and/or function identically, thereby resulting in a uniform expanded set of symbol positions.

In some embodiments, the expansion from the base set of symbol positions to the expanded set is predefined. That is, the number and/or configuration of additional symbol positions is predefined. In other embodiments, the expansion to the expanded set is dynamic. The number and/or configuration of the additional symbol positions may be different each time the feature game is initiated. In one or more examples, a plurality of predefined expanded sets of symbol positions are stored by the game-logic circuitry, and the game-logic circuitry is configured to select one of the predefined sets based on random determinations, game events or game conditions (e.g., the feature trigger event or the expanded set selection from a previous feature game), wager amount or frequency, player input, and/or other suitable variable parameters. In one particular example, the expanded set is selected from three different configurations that add four, eight, or twelve rows of additional symbol positions above a base symbol array, respectively. In this example, the selection is based on a randomly generated value and/or the number of trigger symbols within the feature trigger event. In certain embodiments, rather than selecting from predefined expanded sets, the expanded set is determined based on the same or similar parameters as the selection parameters described above. In these embodiments, the game-logic circuitry may store boundary parameters that define the limits to the dynamic generation of the expanded set of symbol positions, thereby ensuring that the resulting expanded set is suitable for the presentation assembly and the configuration of the feature game.

In at least some embodiments, one or more symbols may be carried over from the base game to the feature game. In one example, the trigger symbols are value-bearing symbols and/or modifier symbols that are used within the feature game as described in detail below (i.e., the functionality described with respect to steps 212 and 214 may be applied to the trigger symbols at the beginning of the feature game).

In the example embodiment, the game-logic circuitry is configured to generate a feature game outcome at step 210 and cause the presentation assembly to present the feature game outcome. Feature game outcomes may be generated in a manner similar to the base game outcomes (e.g., comparing randomly generated values to one or more weighted tables of available symbols or reel stop positions), but may use different weight parameters, sets of symbols, and the like to clearly distinguish between the two game modes. In the example embodiment, the set of available symbols is limited to value-bearing symbols, modifier symbols, and/or other symbols that facilitate the feature gameplay described herein. That is, standard slot symbols may be removed from the one or more sets of available symbols for the feature game. In certain embodiments, the set of available symbols includes blanks, which may appear to be the lack of a symbol in a symbol position.

In at least some embodiments, the new symbols for the feature game outcome are limited initially (prior to the locking functionality described herein) to the base set of symbol positions. In other embodiments, the entire expanded set of symbol positions is configured to receive new symbols within the feature game outcomes. In further embodiments, the expanded set of symbol positions are divided in another suitable manner between positions that receive new symbols and positions that do not receive new symbols. In such embodiments, the division between these types of symbol positions may be visually conveyed via the presentation assembly to enable the player to readily distinguish between symbol position types.

Similar to the base game outcome, the game-logic circuitry is configured to conduct one or more game outcome determinations in response to the feature game outcome. The determinations may include analyze the current state of the feature game (in particular, responsive to the changes introduced by the feature game outcome) in comparison to one or more predefined parameters and/or processes associated with the game outcome determinations. The number and configuration of the feature game outcome determinations are adaptable to the specific aspects of the feature game.

In the example embodiment, one example feature game outcome determination is shown at step 212. More specifically, the game-logic circuitry determines if any new value-bearing symbols occupy the expanded set of symbol positions from the feature game outcome. If no new value-bearing symbols are detected, the game-logic circuitry concludes any other feature game outcome determinations and awaits the next feature game outcome at step 210. If one or more new value-bearing symbols are detected in the feature game outcome, however, then the method 200 proceeds to step 214.

At step 214, the game-logic circuitry is configured to cause the presentation assembly to lock each new value-bearing symbol within the expanded set of symbol positions. More specifically, in the example embodiment, each new value-bearing symbol is locked within the respective subset occupied by the value-bearing symbol. In one example in which each subset is a column of an expanded symbol array, the value-bearing symbol is locked within the next available or unoccupied symbol position (which may include additional symbol positions) at the top of the subset. In another example, the value-bearing symbols are locked at the symbol position occupied during the feature game outcome. In certain embodiments, the value-bearing symbols may be locked into positions external to the initially occupied subset.

Locked value-bearing symbols are accumulated for each subset throughout the feature game. This accumulation is visually represented by locking the value-bearing symbols to symbol positions. The locked symbols may be configured to prevent new symbols from being generated within the corresponding symbol position. That is, as more symbols are locked into a subset, the number of symbol positions available for new symbols may decrease. In one example in which new symbols are limited to the base set of symbol positions and each position subset is a column of an expanded symbol array, locking symbols within the additional symbol positions of a given subset does not affect the new symbol generation for the subset. However, when the locked symbols begin to encroach on the base set (i.e., the base symbol array), the number of symbol positions available for new symbols decreases, which may affect the probability of landing new value-bearing symbols. In certain embodiments, each change to the base set of a subset may cause the game-logic circuitry to change the underlying weight parameters, available symbols, and the like.

In the example embodiment, each position subset is associated with an award condition that is defined by accumulated an award threshold number of locked symbols within the subset. In some embodiments, the award threshold is equal to the number of symbol positions within a subset (i.e., filling the subset with locked symbols). In other embodiments, the award threshold is less than the total number of symbol positions within a subset. For example, the award threshold may be equal to the number of additional symbol positions in the subset or a number untethered to the number of base set positions and/or additional symbol positions in the subset (e.g., a randomly determined number). In certain embodiments, the award threshold may be different for each subset or based on one or more features of the subset. For example, the subsets may be columns having different heights (i.e., different numbers of symbol positions), and the award threshold is defined by the height of each subset.

In other embodiments, other award conditions may be associated with the position subsets in addition to or in place of the award threshold. In one example, the award conditions include a particular award symbol or symbols being locked into a respective subset. In another example, an award symbol may trigger award conditions for multiple subsets at once.

At step 216, the game-logic circuitry is configured to determine in response to step 214 if any position subset has achieved the respective award threshold. In particular, the game-logic circuitry stores a value representing the award threshold, and the stored value is compared to a current count of locked symbols for each subset.

Prior to a counter being initiated as described herein, if no new award threshold has been reached, then the method 200 bypasses the steps 220-224 and awaits the next feature game outcome at step 210. That is, in at least some embodiments, the feature game is initiated without a limited duration, and the limited duration is only active after an initial award threshold or award condition is achieved. In other words, in these embodiments, at least one award associated with the subsets is guaranteed because the limited duration of the feature game is initiated in response to achieving at least one award. In certain embodiments, the counters described herein are active throughout the feature game, and therefore the method 200 proceeds as illustrated and described herein.

If an initial new award threshold is achieved, the game-logic circuitry is configured to initiate an outcome counter associated with the feature game. In at least some embodiments, the outcome counter is visually presented by the presentation assembly to enable the player to readily monitor a current count of the outcome counter. The outcome counter is initiated at an initial count and is configured to be incremented or decremented towards a termination count. For example, the initial count may be three, and the termination count is zero such that the outcome counter is decremented from three to zero as described herein. Other suitable mathematical and logical operations may be implemented to administer the outcome counter. The current count of the outcome counter is stored by the game-logic circuitry to facilitate the determinations associated with the counter.

If the outcome counter is already initiated at step 218, then the current count of the outcome counter is reset to a reset value. In some embodiments, the reset value is the initial value. In other embodiments, the reset value may be a different value greater than or less than the initial value. In one example, the current count prior to resetting determines the reset value, where the reset value is a function of the current count or is selected from a predefined table of reset values based on the current count.

Following step 218, because the outcome counter is either initiated or reset, the feature game continues for at least one additional feature game outcome. Accordingly, the feature game continues at step 210 with the next feature game outcome.

In the example embodiment, if no new award threshold is detected from the feature game outcome and the outcome counter is active, the method 200 proceeds to step 220. In particular, the game-logic circuitry updates the outcome counter towards the termination count or value. The presentation assembly is configured to update a corresponding presentation of the counter in response to the update to the counter. The update to the counter may include incrementing or decrementing the current count of the outcome counter and storing the updated current count.

In some embodiments, the determination at step 216 is dependent upon additional and/or alternative parameters. In one example, step 218 may be triggered if more than one new award threshold is achieved. In another example, the outcome counter is only updated in response to feature game outcomes satisfying certain criteria, such as feature game outcomes with no new value-bearing symbols. In such an example, if a new value-bearing symbol is detected from the feature game outcome, the current count may remain the same.

Following step 220, at step 222, the game-logic circuitry determines whether or not the outcome counter has reached or bypassed the termination count or value. In particular, the game-logic-circuitry compares the current count to a stored value representing the termination count. If the termination count has not been reached, the feature game continues at step 210 for a subsequent game outcome. If the termination count has been reached, the feature game proceeds to conclude with an award sequence for at least the locked symbols and awarding subsets (i.e., the subsets that have reached or exceeded the award threshold and/or other associated award conditions).

At step 224, the game-logic circuitry causes the presentation assembly to present an award sequence for one or more awards associated with the awarding subsets. In particular, the award values associated with the locked value-bearing symbols within at least the awarding subsets are accumulated to form an aggregate award, and the presentation assembly is configured to present one or more graphical elements, animations, and the like to convey the presence of the award to the player. In at least some embodiments, a meter (e.g., a credit balance meter) is updated to include the aggregate award. In other embodiments, the award is another suitable mathematical and/or logical function of the award values associated with the locked value-bearing symbols in the awarding subsets. Although a single award sequence is described above for all awarding subsets, it is to be understood that the award sequence may be divided into subsequences for each awarding subset and/or in subsequences to occur at different times within the feature game. For example, a portion of the award sequence may be presented immediately following step 216 for each corresponding awarding subset, while another subsequence is performed at step 224 for all of the awarding subsets.

Following the step 224, the feature game is concluded, and the gameplay continues with the base game (or another suitable game). The game interface is configured to transition from the feature game interface to the base game interface to visually convey to the player the change in game state and to accommodate the configuration of the base game. For example, the additional symbol positions of the expanded set of symbol positions are removed from the interface, thereby leaving the base set of symbol positions for play of the base game.

The method 200 then continues at step 204 until a cashout process is initiated, which concludes the wagering game. The cashout process includes providing the credit balance back to the player in the form of a physical or digital credit output. In one example, one or more tokens, tickets, cards, bills, or other physical credit items are output from the gaming machine using a corresponding credit input/output device. In another example, a digital wallet or other account associated with the player is credited with the credit balance. The gaming session is then concluded, and the gaming machine awaits another player initiating a subsequent gaming session.

Although the method 200 above is described with respect to value-bearing symbols, it is to be understood that additional or alternative types of symbols may be used with the method 200. In some embodiments, modifier symbols may also be locked within the expanded set of symbol positions. The modifier symbols do not (at least initially) include a direct award value like the value-bearing symbols, but rather: (i) affect the value of one or more other value-bearing symbols, (ii) gain an award value based on one or more other game elements, such as the value-bearing symbols, an award wheel, or a prize board, and/or (iii) impact play of the feature game in a manner other than modifying award values. Examples of impacting play of the feature game include, without limitation, resetting the outcome counter, increasing the number of locked symbols in a subset, modifying the number of symbol positions in a subset, moving locked or unlocked symbols between subsets, and the like. The modifier symbols may include indicia and/or other visual characteristics that enable the player to readily distinguish the modifier symbols and the corresponding impact on the feature game. In other embodiments, the locked symbols are not value-bearing symbols, but rather are symbols associated with particular award values based on the combination of symbols forming the awarding subsets. It is to be understood that these non-value-bearing symbols and modifier symbols may be incorporated into the steps of the method 200 similar to value-bearing symbols as described above.

In some embodiments, the award indicia of the value-bearing symbols may be initially hidden from the feature game interface. In such embodiments, the presentation assembly is configured to reveal the award indicia through play of the feature game. In one example, the award indicia of a given value-bearing symbol is revealed in response to locking the value-bearing symbol into a subset. In another example, the award indicia is revealed at step 224. The reveal may be incorporated within a presentation sequence (e.g., the award sequence or a feature game outcome sequence) via one or more presentation elements, changes to the presentation elements, and/or animations presented by the presentation assembly.

In certain embodiments, the feature game may be configured to include additional subsets or columns. The additional subsets may be added in response to certain trigger events, such as the initiation of the feature game, meeting the award threshold for all subsets in the expanded set, detecting one or more expansion symbols in a feature game outcome, and the like. In one example, one or more additional subsets are added to the expanded set at the initiation of the feature game in response to the trigger event initiating the feature game meeting one or more additional conditions (e.g., detecting a number of trigger symbols exceeding a secondary threshold beyond the trigger threshold). In such an example, the additional subsets may increase the number of subsets to be filled before the outcome counter is initiated (e.g., two subsets). In some embodiments with additional subsets, the additional subsets may include additional or alternative functions relative to the subsets forming the expanded set. In one example, a multiplier is applied to any value-bearing symbols locked in the additional subsets. In another example, rather than progressing towards an award threshold, the value-bearing symbols locked in the additional subsets are applied to one or more subsets or locked symbols, where applying the symbols increase the value of an awarding subset (e.g., adding the value of the locked symbols to the value of another value-bearing symbols locked in the expanded set). In some embodiments, the additional subsets may be selectively removed during play of the feature game. For example, the additional subset may persist for a predetermined number of feature game outcomes, a predetermined number of reset conditions, and/or until a removal trigger is detected in the feature game. Symbols locked within the removed additional subset may also be removed or allocated to the other subsets of the expanded set.

Figure 5:
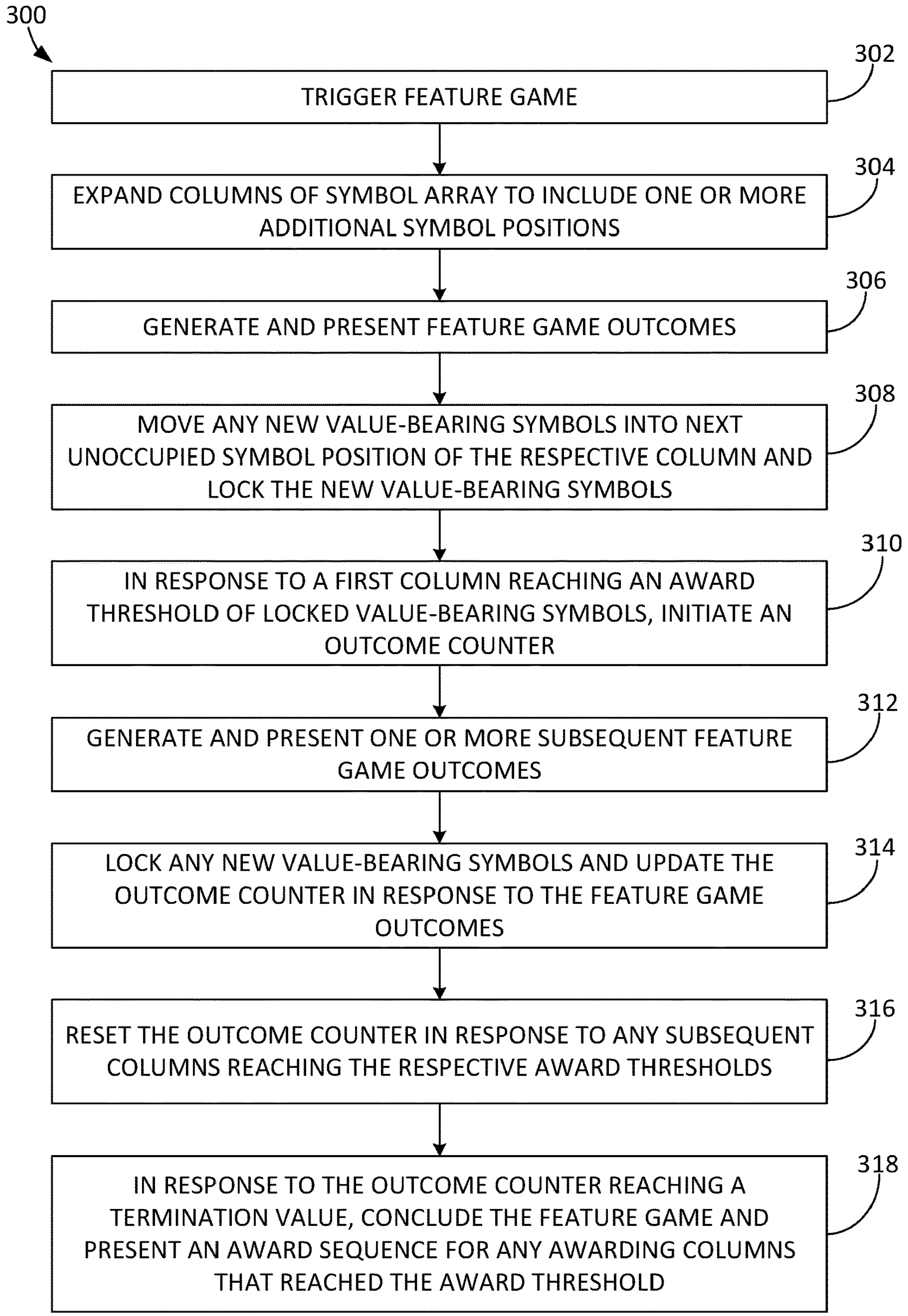
FIG. 5 is a flow diagram of an example method of conducting and presenting a feature game using an expanded symbol array and a dynamic, counter-based game duration, according to an embodiment of the present invention.

FIG. 5 depicts a flow diagram of an example method 300 of conducting a feature or bonus game using a gaming system (e.g., the system shown in FIGS. 1 and 2). The method 300 is performed using a presentation assembly of a gaming machine and game-logic circuitry in communication with the presentation assembly. The game-logic circuitry may be independent from, partially integrated with, or wholly integrated with the gaming machine. In other embodiments, the method 300 includes additional, fewer, or alternative steps and/or is performed by a different configuration of devices within the gaming system.

In the example embodiment, the method 300 is associated with a wagering game including at least a base game and a feature game. The base game includes a base symbol array. The base symbol array is formed using a base set of symbol positions arranged into rows and columns. The base symbol array may be uniform (i.e., the same number of symbol positions in each row and/or column), or the array may be non-uniform. In one example, one column of the base symbol array has a different number of symbol positions relative to a second column. In other embodiments, other suitable configurations of symbol positions may be used, including configurations with multiple arrays and/or symbol-bearing game elements other than an array.

The symbol positions are configured to be occupied by randomly selected symbols from one or more sets of available symbols. In at least some embodiments, the sets of available symbols are symbol-bearing reel strips, each of which are associated with a respective one or more symbol positions (e.g., one reel strip associated with a single symbol position or a single column of the base symbol array).

At step 302, the feature game is triggered and initiated. The feature game is triggered and initiated in response to one or more trigger events. In one example, the trigger event includes at least a threshold number of trigger symbols within a game outcome of a base game associated with the feature game. At the initiation of the feature game, a game interface presented by the presentation assembly is transitioned to a feature game interface, which may include presentation and/or game element changes and/or a transitional sequence of animations and/or presentation elements indicating the initiation of the feature game. In some embodiments, a base game interface is transitioned into the feature game interface by the presentation assembly. For example, at the initiation of the feature game, the base symbol array is expanded to include additional symbol positions, where the base symbol array and the additional symbol positions define an expanded symbol array.

In the example embodiment, at step 304, the presentation assembly expands the columns of the base symbol array to include additional symbol positions. The additional symbol positions may be presented above the base symbol array. The expansion of the columns may be uniform (i.e., each column is expanded by the same number of additional symbol positions) or non-uniform. The expansion may be determined for all of the columns at once or independently for each column. The expansion may be predefined (i.e., stored by the game-logic circuitry), at least partially randomly determined, and/or based on game events or conditions. In one example, the expansion is based at least partially on the trigger event, such as the number of trigger symbols being used to determine the number of additional symbol positions added to the array. In certain embodiments, the expansion may result in a column of the base symbol array including no additional symbol positions.

The expanded symbol array includes a plurality of positions subsets. As described herein, the position subsets are associated with a locked symbol award within the feature game. In the example embodiment, each position subset is a column of the expanded symbol. In other embodiments, other suitable subsets may be defined within the expanded symbol array, including those described elsewhere herein.

In at least some embodiments, in addition to the changes to the symbol array, the feature game interface may include one or more game elements from the base game. For example, one or more symbols may be preserved from the base game, such as the trigger symbols from the base game. In such an example, the trigger symbols may be locked within the expanded array similar to the symbols described herein (e.g., steps 308, 310, and 314). In certain embodiments, prior to any feature game outcomes, other symbols or game elements may be added to the feature game interface in response to the feature game initiating. For example, one or more value-bearing symbols (similar to the value-bearing symbols described herein) are added and locked to the expanded symbol array prior to any feature game outcomes.

At step 306, the game-logic circuitry generates a feature game outcome and causes the presentation assembly to present a corresponding game outcome sequence. The feature game outcomes include one or more randomly selected symbols from one or more sets of available symbols for the feature game. In some embodiments, the sets of available symbols of the feature game are different from the available sets of the base game. In other embodiments, the sets of available symbols for the feature game are at least partially similar to the sets of the base game. In one example, certain base game symbols may be removed from the available symbols in the feature game to be selectively replaced with blanks, value-bearing symbols, and/or modifier symbols for play of the feature game.

The feature game outcome is presented through animated changes to the feature game interface. For example, the feature game outcome may be represented through an animation spinning feature game reel strips (i.e., sets of available symbols for the feature game) and stopping such that the symbols forming the generated feature game outcome are presented within the expanded symbol array. Other suitable animations, corresponding game outcome generation, and game outcome determinations may be used with the method 300. For example, new symbols may not populate the expanded symbol array, but rather are generated or selected using an external game element, such as a wheel of available symbols.

In the example embodiment, new symbols from the feature game outcome are limited to initially populating the base symbol array. That is, the additional symbol positions are not used to generate the feature game outcome—which would add additional symbol positions for new symbol generation—but rather are configured to hold locked symbols as described herein. Limiting the new symbol generation to the base game array has the added advantage of enabling the feature game logic to be consistent irrespective of the dynamic array size of the expanded symbol array. Accordingly, computing and/or storage resources of the game-logic circuitry that otherwise would be committed to adapting the game logic to the current array size and configuration (i.e., adding and removing the symbol positions to and from the game outcome determinations and symbol selection) are free to use for other functionality of the gaming system, including other functions associated with the feature game described herein. In at least some embodiments, the base symbol array and the additional symbol positions are visually distinguished from each other by the presentation assembly to aid the player in understanding the functional difference between the symbol position types. In other embodiments, the additional symbol positions are configured to accept new symbols within the feature game outcomes.

In response to each feature game outcome, the game-logic circuitry is configured to execute one or more game outcome determinations. For example, for each feature game outcome, the game-logic circuitry is configured to detect any new value-bearing symbols from the feature game outcome and/or other special symbols of the feature game (e.g., modifier symbols). Detection of the new value-bearing symbols is not limited to identifying the presence of the value-bearing symbols, but also includes determining which subset (e.g., column) the occupied symbol position is within. At step 308, in response to detecting any value-bearing symbols within the feature game outcome, the value-bearing symbol is locked within the subset of the expanded symbol array occupied by each value-bearing symbol. More specifically, in the example embodiment, each value-bearing symbol is moved into the "next" unoccupied symbol position of the column or subset and then is locked or held in place for any subsequent feature game outcomes. As used herein, the use of "next" or "next unoccupied symbol position" in this context refers to a predefined order of the symbol positions within a subset, such as an order defined by a positional relationship between the symbol positions. In one example, for a column subset, the order of the symbol positions is defined from the top symbol position downwards, where new value-bearing symbols are locked into the highest unoccupied symbol position of the column. In another example, a row subset defines an order from left to right through the symbol positions. In a further example, the symbol positions of a subset include indicia or other suitable visual indicators of the predefined order within a given subset.

In the example embodiment, both the expanded symbol positions and symbol positions of the base symbol array are configured to receive and hold locked symbols. Locking a symbol within a symbol position prevents other symbols being locked within the position and/or prevents the position from being used within the feature game outcome generation. For example, as symbols are locked within the base symbol array reduces the available symbol positions for a subsequent feature game outcome. In other embodiments, a symbol position with a locked symbol may be configured to hold multiple locked symbols and/or continues to be used within the subsequent feature game outcomes to receive new symbols.

The steps 306 and 308 are repeated for one or more feature game outcomes until an award threshold of locked symbols is reached for at least one column or subset of the expanded array. In the example embodiment, the award threshold for a given subset is equal to the number of symbol positions within the subset. In other embodiments, the award threshold is less than the number of symbol positions within the subset, such as an award threshold matching the number of additional symbol positions. The award threshold may be the same for all subsets or independent for each subset. The award threshold is stored by the game-logic circuitry to determine one or more awards associated with the feature game as described herein. Accordingly, repeating steps 306 and 308 until an award threshold is reached means that at least one award of the feature game is guaranteed.

At step 310, in response to the game-logic circuitry detecting a first column being the first subset to reach the respective award threshold by comparing the stored award threshold to the number of locked symbols within the first subset, the game-logic circuitry initiates an outcome counter for the feature game. The outcome counter is used by the game-logic circuitry to define a dynamic duration of the feature game. That is, the outcome counter is initiated at an initial value and is updated responsive to the subsequent feature game outcomes (e.g., step 312) to progress towards a termination count unless other game events are detected as described herein. The outcome counter may be one or more variables stored by the game-logic circuitry. In at least some embodiments, the presentation assembly is configured to visually present the outcome counter and/or change the feature game interface and corresponding presentation responsive to a current count of the outcome counter. For example, reaching a count adjacent to the termination count may cause the presentation assembly to adjust the presentation of certain symbols or symbol positions and/or change the audio presentation to a faster-paced audio sample.

In the example embodiment, the outcome counter is updated in response to each and every subsequent feature game outcome. In other embodiments, the outcome counter is updated in response to feature game outcomes having the presence or absence of certain game events. For example, the outcome counter may be updated only in response to feature game outcomes with no new value-bearing symbols (and/or other lockable symbols).

Following the initiation of the outcome counter, the game-logic circuitry generates one or more subsequent feature game outcomes and causes the presentation assembly to present the subsequent feature game outcomes at step 312. For each feature game outcome, at step 314, the game-logic circuitry detects any new value-bearing symbols or other lockable symbols within the subsets and causes the presentation assembly to lock the detected symbols (similar to the step 308) within the subset.

In addition to locking the new lockable symbols at step 314, the game-logic circuitry updates the outcome counter in response to the feature game outcome. In particular, if no new award thresholds have been reached, the outcome counter is incremented or decremented towards the termination count. However, if a new award threshold has been reached based on the newly locked symbols, the outcome counter is reset to a reset value at step 316, thereby extending play of the feature game. The reset value may be predefined, random, or based on game events or conditions. In one example, each new award threshold awards three additional feature game outcomes, where achieving two award thresholds at once would result in the outcome counter being reset to a value of six. It is to be understood that resetting the outcome counter is intended to capture several mathematical and/or logical operations to the underlying variables of the counter that functionally provide the same impact of adding feature game outcomes to the duration of the feature game. For example, one of ordinary skill in the art would readily recognize that changing the termination count rather than (or in addition to) the current count of the outcome counter still provides the same functionality to the feature game.

Steps 312-1316 repeat for a plurality of feature game outcomes until the outcome counter reaches the termination count or value. In response to the counter reaching or exceeding the termination count, at step 318, the game-logic circuitry concludes the feature game and causes the presentation assembly to present an award sequence for any awarding columns or subsets, where the awarding columns reached the respective award thresholds during the feature game. In the example embodiment, the award sequence includes one or more animations and/or presentation elements visually indicating one or more awards based on the locked symbols within the awarding columns. In one example, the award values indicated by the locked value-bearing symbols of the awarding columns are aggregated together as an award to be applied to a credit balance of the player. In another example, any locked modifier symbols are applied to one or more award values associated with the locked symbols to generate a total award value. Other suitable mathematical and/or logical operations may be used to generate an award for the awarding columns based on the locked symbols. For example, based on the number of locked symbols and/or awarding columns, one or more secondary game outcomes (e.g., spinning an award wheel or selecting from a prize board) may be generated and presented to provide corresponding award.

FIGS. 6A-6I depict an example game interface 400 of a gaming system (e.g., the system shown in FIGS. 1 and 2) within a plurality of states according to one or more embodiments of the present disclosure. The game interface 400 is presented by a presentation assembly of a gaming machine within the gaming system, and the presentation assembly is in communication with game-logic circuitry to perform the functions described herein. In other embodiments, the interface 400 may include additional, fewer, or alternative game elements, presentation elements and/or animations, including those described elsewhere herein.

Figure 6A:
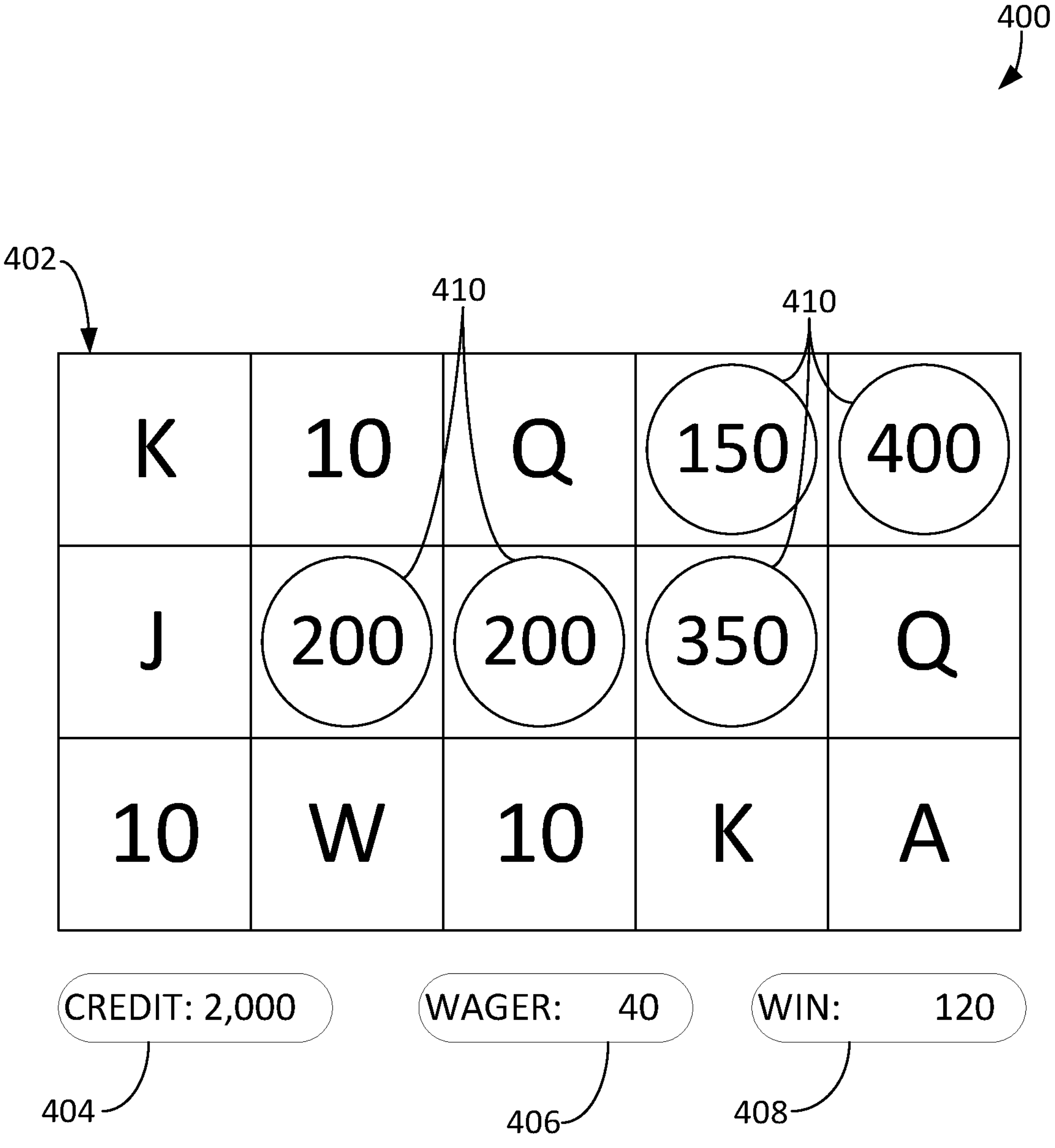
FIG. 6A is an example game interface of a gaming system in a first state with a feature trigger event, according to an embodiment of the present invention.

FIG. 6A depicts the game interface 400 in a first state. The game interface 400 in the first state is in a base game configuration for play of a base game component of a wagering game. The interface 400 includes a base symbol array 402 of symbol positions arranged into a plurality of columns and rows. In the illustrated embodiment, each column includes three symbol positions, and each row includes five symbol positions. In other embodiments, the base symbol array 402 includes a different configuration of symbol positions, includes non-uniform rows and/or columns.

The game interface 400 further includes a credit meter 404, a bet meter 406, and an award meter 408 that provide the player with a visual indication of the state of the wagering game. That is, the credit meter 404 visually indicates the credit balance of the gaming session, the bet meter 406 visually indicates the last or current wager, and the award meter 408 indicates the last or current award provided in response to a game outcome.

In the example embodiment, the base game includes populating the base symbol array 402 with randomly selected symbols to generate and present a base game outcome. The first state of the interface 400 depicts a base game outcome. In some embodiments, the symbol positions of the base symbol array 402 are associated with symbol-bearing reel strips that are animated to spin and stop to present a base game outcome. In one example, each symbol position is associated with a respective reel strip. In another example, each column is associated with a respective reel strip.

In addition to the standard symbols used to determine winning symbol combinations (e.g., via pay lines or scatter combinations), the base game outcome of the first state includes a plurality of value-bearing symbols 410. The value-bearing symbols 410 include award indicia visually indicating a corresponding award value for each value-bearing symbol 410. In some embodiments, the value-bearing symbols 410 may not initially include visible award indicia, but rather the indicia is reveal through subsequent game events or conditions. For example, the award indicia may be hidden until a feature game is triggered.

The value-bearing symbols 410 act as trigger symbols for the feature game component of the wagering game. That is, a base game outcome including at least a threshold number of trigger symbols is detected by the game-logic circuitry as a trigger event. In the example embodiment, the trigger threshold number is three trigger symbols. Accordingly, the first state includes a trigger event, and a feature game is initiated as described herein. In other embodiments, other suitable number of trigger symbols define a trigger event and/or other trigger events are available within the base game. In certain embodiments, the value-bearing symbols 410 include additional functionality within the base game, such as operating as wild symbols for determining winning symbol combinations.

Figure 6B:
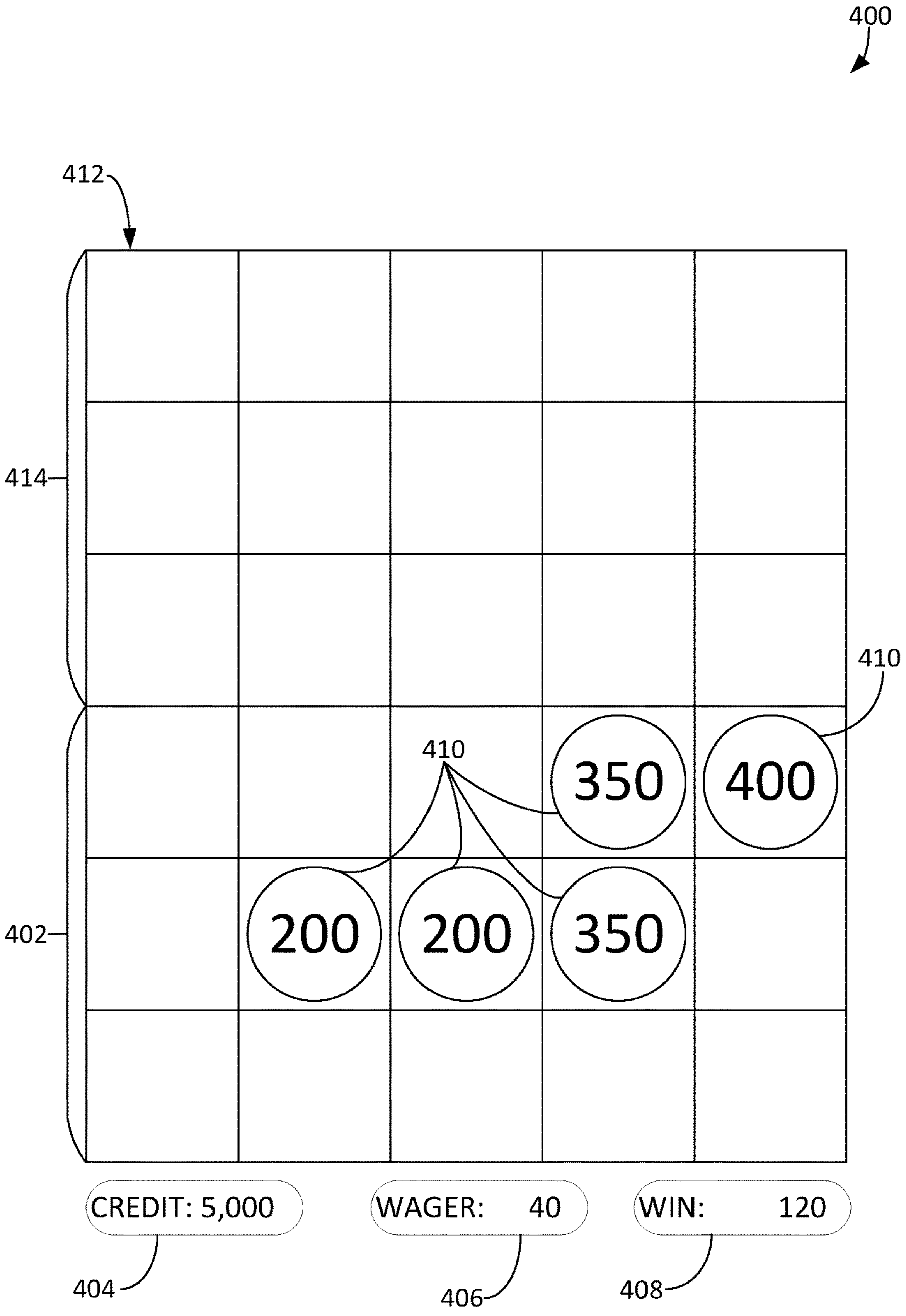
FIG. 6B is the game interface of FIG. 6A in a second state with an expanded set of symbol positions of a feature game, according to an embodiment of the present invention.

FIG. 6B depicts the game interface 400 in a second state following the first state. In the second state, the game interface 400 is transitioning to the feature game. More specifically, the game interface 400 is updated to include an expanded symbol array 412. The expanded symbol array 412 includes the base symbol array 402 and a plurality of additional symbol positions 414. In at least some embodiments, the base symbol array 402 is animated to expand (i.e., revealing the additional symbol positions 414) to the expanded symbol array 412. In other embodiments, the expanded symbol array 412 includes a different configuration of symbol positions, such as configurations with additional symbol positions below and/or to the side of the base symbol array 402.

The expanded symbol array 412 is divided into a plurality of subsets. In the example embodiment, each subset is a column of the array 412. In other embodiments, other suitable subset configurations (including overlapping subsets) may be used and visually indicated via the game interface 400.

In the example embodiment, three additional symbol positions 414 are added to each column. In other embodiments, additional or fewer (including none) additional symbol positions 414 are added to each column. In some embodiments, the base symbol array 402 and the additional symbol position are visually distinct from each other to visually indicate the different function between the two types of symbol positions as described herein.

In the illustrated embodiment, the trigger symbols 410 are carried over to the feature game, while the other symbols from the first state are removed, shown in an inactive state, or otherwise removed prior to an initial feature game outcome. For clarity purposes, the symbols not related to the feature game functionality described herein are not shown. However, it is to be understood that additional game features (e.g., determining winning symbol combinations) may be implemented within the feature game.

Figure 6C:
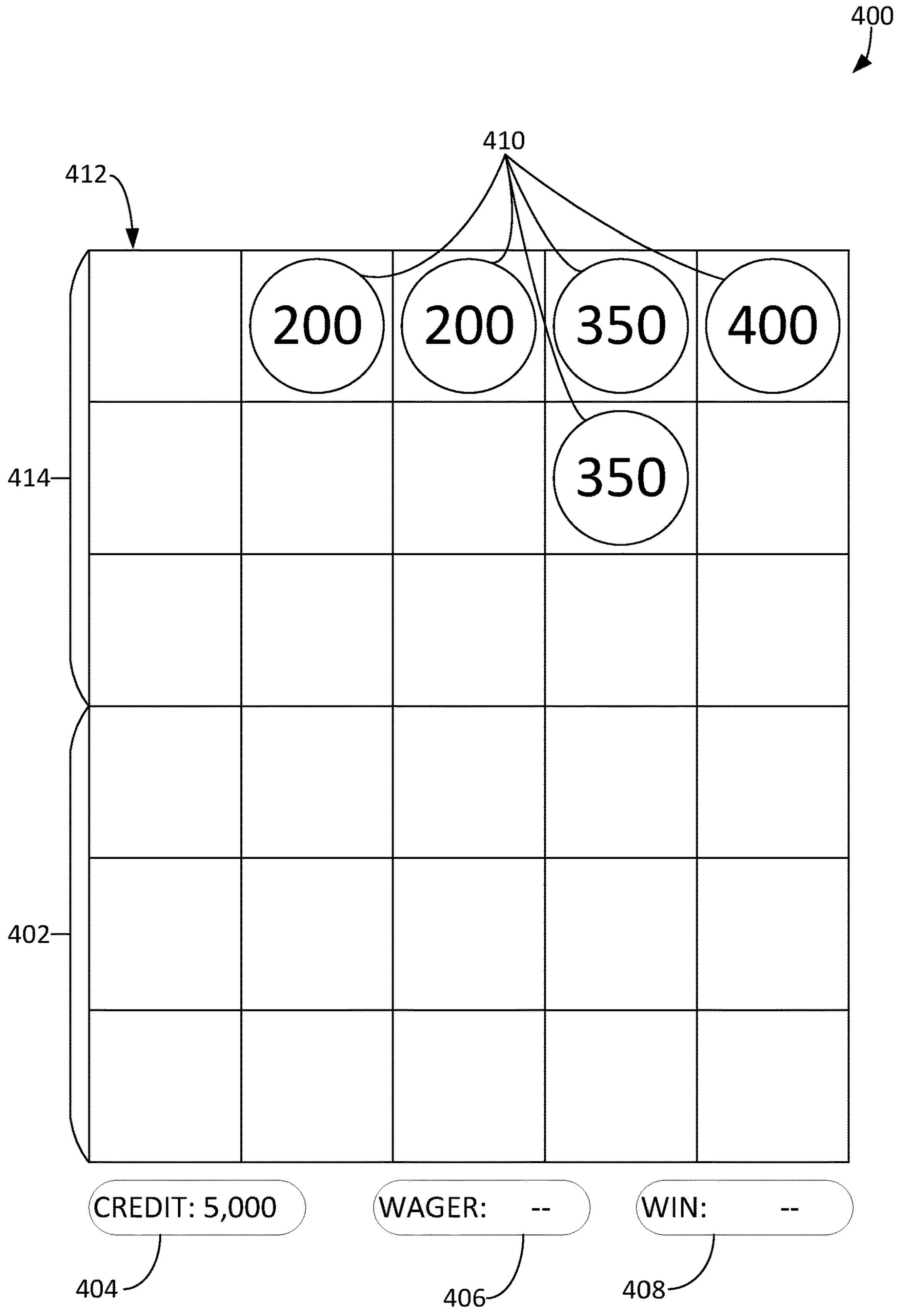
FIG. 6C is the game interface of FIG. 6A in a third state with locked value-bearing symbols moved to the top of the symbol array, according to an embodiment of the present invention.

FIG. 6C depicts the game interface 400 in a third state following the second state. In the third state, the game interface 400 is still within the transition to the feature game. More specifically, the third state includes locking the trigger value-bearing symbols 410 into the expanded symbol array 412. The locked value-bearing symbols 410 are configured to persist for the duration of the feature game. In at least some embodiments, symbols are locked within the respective subsets based on a predefined order of positions within each subset. In the example embodiment, symbols are locked within the columns using a top-down scheme, where symbols are locked into the next available position at the top of the respective column. Other suitable locking schemes, including an upwards scheme, may be used in other embodiments.

In the illustrated embodiment, when compared to FIG. 6B, the value-bearing symbols 410 are moved to the top of the column that each symbol 410 originally occupied. The fourth column had two value-bearing symbols 410, so the second (or lower) symbol 410 occupies the second symbol position from the top within the column. The symbols may be animated to move and lock within the expanded symbol array 412. In some embodiments, the value-bearing symbols 410 may be locked into other columns or subsets other than the one originally occupied by each symbol 410. For example, all of the value-bearing symbols 410 may be moved to and locked within a single column.

In illustrated embodiment, the appearance of locked symbols is the same as prior to the locking process. In other embodiments, the locked symbols may change in appearance, including the removal of the graphical element that represents the symbols. In embodiments where the symbol is removed, the award indicia may persist within the symbol position. Other suitable visual changes to the locked symbol and/or associated symbol position may be used according to the configuration and theme of the wagering game.

Figure 6D:
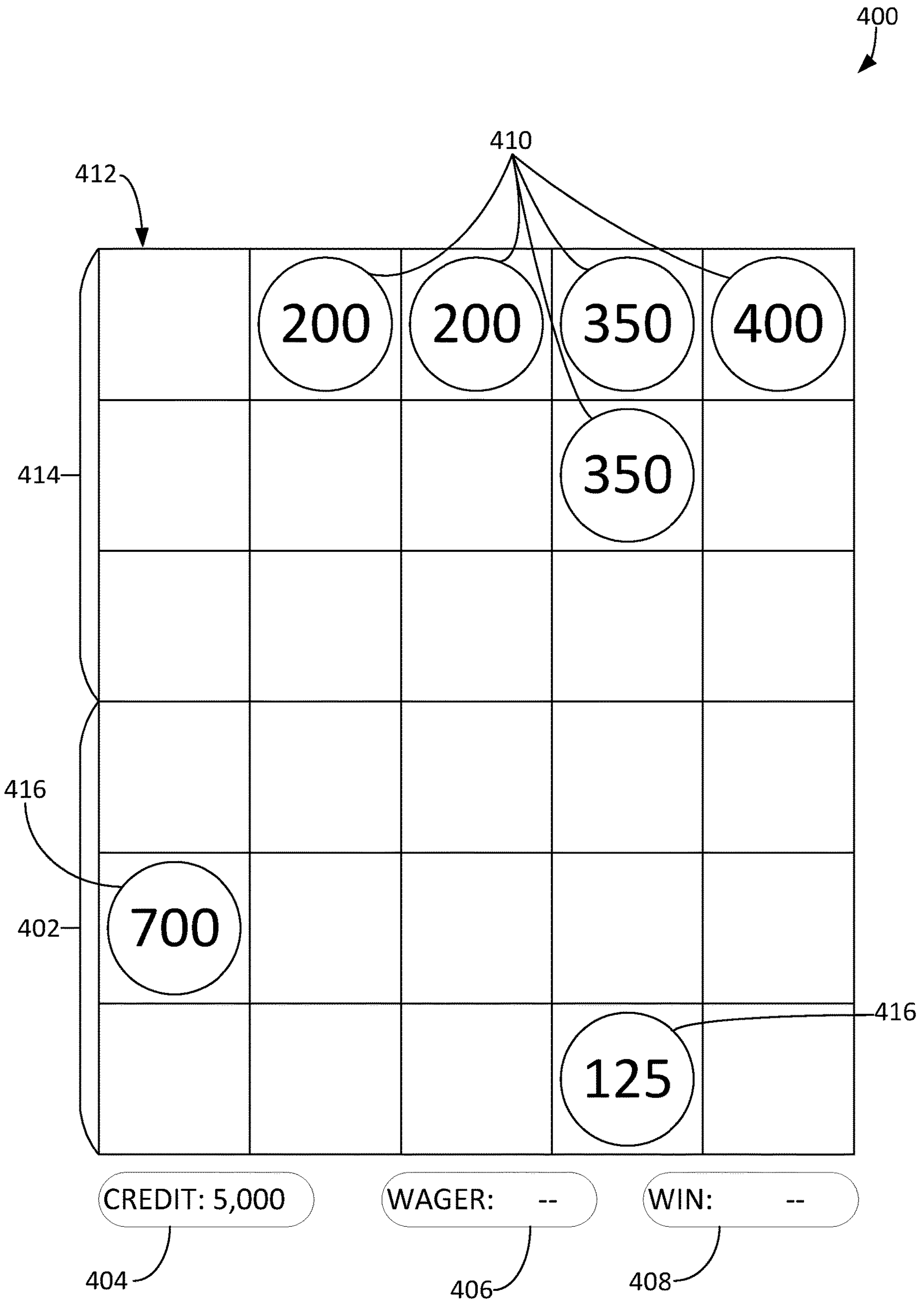
FIG. 6D is the game interface of FIG. 6A in a fourth state with additional value-bearing symbols generated from a subsequent feature game outcome, according to an embodiment of the present invention.

FIG. 6D depicts the game interface 400 in a fourth state following the third state. In the fourth state, an initial feature game outcome is presented. In the example embodiment, feature game outcomes include selectively populating the base symbol array 402 with value-bearing symbols, modifier symbols, blanks (i.e., no symbol), and/or other suitable symbols configured to facilitate the functions of the feature game. The additional symbol positions 414 are not populated with new symbols from the feature game outcomes, but instead hold locked symbols. The base symbol array 402 is configured to both include new symbols from feature game outcomes and hold locked symbols as described herein.

In the illustrated embodiment, the initial feature game outcome includes two new value-bearing symbols 416 within the first and fourth columns of the expanded symbol array 412. In response to detecting the new value-bearing symbols 416, a locking sequence including one or more animations, updated presentation elements, and the like is displayed by the presentation assembly to lock the symbols 416 into the corresponding columns.

Figure 6E:
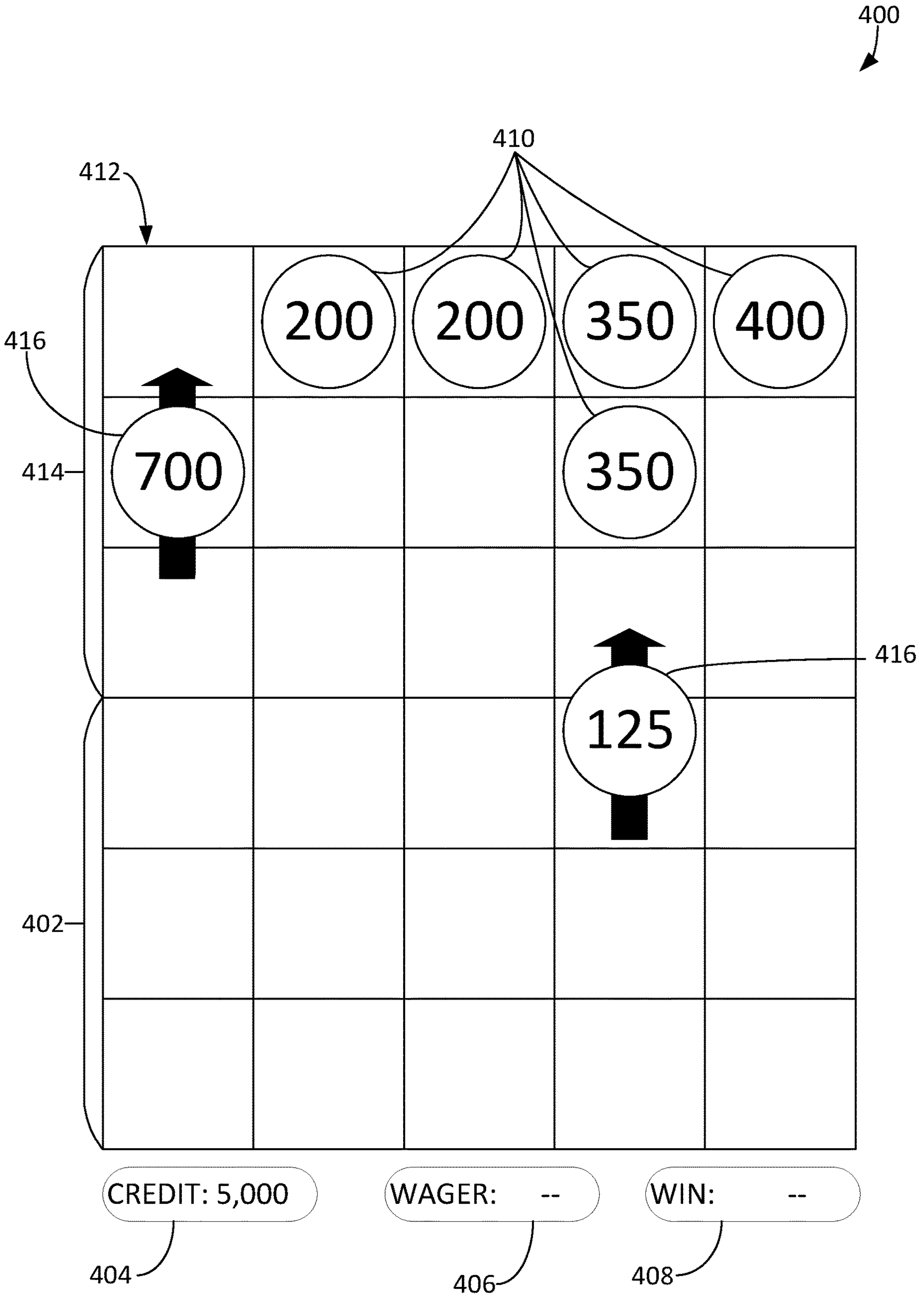
FIG. 6E is the game interface of FIG. 6A in a fifth state with the additional value-bearing symbols from the fourth state being locked at the next available symbol position at the top of the respective columns, according to an embodiment of the present invention.

FIG. 6E depicts the game interface 400 in a fifth state following the fourth state. The fifth state depicts the locking sequence for the new value-bearing symbols 416 from the fourth state. In particular, the new value-bearing symbols 416 are animated to move up the respective columns to the next available symbol position. For the symbol 416 occupying the first column, the symbol 416 is locked into the top position because no preexisting locked symbols are present in the column. The other symbol 416 occupies the fourth column, which already has two locked value-bearing symbols. Accordingly, the symbol 416 is locked into the third position from the top of the column, which is the next highest available position within the column.

In certain embodiments, new value-bearing symbols 416 may be combined with preexisting locked symbols. For example, with respect to the fourth column, the new value-bearing symbol 416 is removed from the interface 400 and one or more of the locked symbols within the columns are updated at least partially as a function of the award indicia of the new value-bearing symbol 416 (e.g., the bottom locked symbol 410 is updated to have a new award value of 475 as a result of combining the preexisting award value with the value of the new value-bearing symbol 416).

Figure 6F:
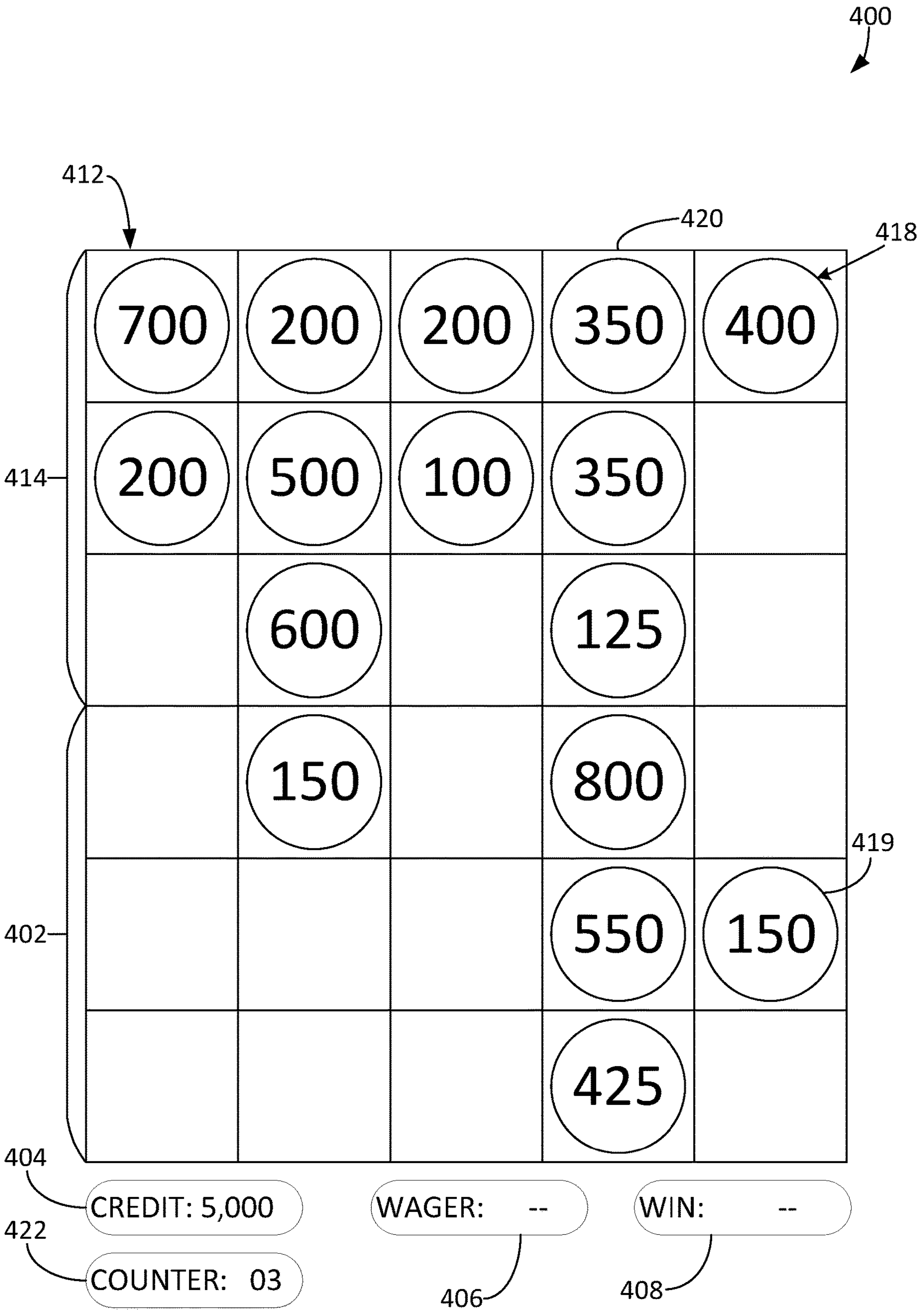
FIG. 6F is the game interface of FIG. 6A in a sixth state with one column filled with value-bearing symbols and an outcome counter initiated, according to an embodiment of the present invention.

FIG. 6F depicts the game interface 400 in a sixth state following the fifth state. The sixth state illustrates an example feature game outcome at least one or more outcomes beyond the fifth state. In comparing the fifth and sixth states, the expanded symbol array 412 includes new locked symbols 418 and two new value-bearing symbols 419 that are not yet locked into the array 412.

In the sixth state, the second and fourth columns include locked symbols occupying the base symbol array 402. In at least some embodiments, locking symbols within the base array 402 may decrease the probability and/or opportunity to receive new symbols within the column. For example, prior to the outcome shown in the sixth state, the fourth column only had one symbol position available for new symbols (i.e., the bottom position, which is occupied by the new symbol 419 in the sixth state). In other embodiments, the locked symbols that occupy the base symbol array 402 do not affect the feature game outcomes, particularly with respect to new symbol generation. In such embodiments, the symbol positions occupied by the locked symbols 418 may still be configured to receive new symbols. That is, the locked symbols 418 may operate similar to a watermark, indicia, or background associated with the symbol position.

In response to the feature game outcome of the sixth state, the game-logic circuitry detects that the award threshold associated with the fourth column has been achieved, and therefore indicates (via one or more stored variables) that the fourth column is an awarding column 420. That is, during or after the feature game, an award sequence will be presented for an award that is at least partially associated with the awarding column 420 and the corresponding locked symbols 418.

In the example embodiment, the award threshold for each column is achieved by filling the column with locked symbols. In other embodiments, the award threshold may be less than the symbol positions within a given column. For example, the award threshold of a column may be achieved by locking symbols within all the additional symbol positions 414 of the column, where additional locked symbols enhance the corresponding award or are applied to other columns that have not reached the award threshold. In one or more embodiments in which the award threshold is set less than the total number of positions within the column, one or more modifiers may be applied to the locked symbols that exceed the award threshold. For example, if the award threshold is set to fill the additional symbol positions 414, locking symbols in the column within the base array 402 applies a multiplier or additional award value to the award value of one or more locked symbols (e.g., the symbol(s) occupying the base array 402).

The award threshold may be defined across all subsets of the array 412, or the award threshold may be independently defined for each subset. In certain embodiments, the award threshold is dynamic (i.e., changing according to random determinations and/or game events or conditions) and/or selectively active, where an inactive award threshold results in the game-logic circuitry ignoring a corresponding subset that would otherwise be an awarding subset.

In addition to identifying the fourth column as an awarding subset or column 420, the game-logic circuitry updates the game interface 400 in response to the feature game outcome. More specifically, the game-logic circuitry causes the presentation assembly to lock any other new symbols (e.g., the symbol shown in the fifth column) according to the locking processes described above and to present an outcome counter 422 in an initial state. That is, the outcome counter 422 is initiated in response to an initial awarding threshold being achieved by one or more subsets (i.e., the awarding column 420), thereby ensuring an award sequence associated with at least one subset is presented for the feature game instance. In other embodiments, the outcome counter 422 is initiated in response to another game event or condition associated with the feature game. For example, and without limitation, the outcome counter 422 may be initiated in response to the start of the feature game, one or more subsets reaching a counter threshold number of locked symbols (e.g., filling the additional symbol positions 414 of one or more columns), expiration of an initial duration of the feature game, and the like.

In the example embodiment, the outcome counter 422 is initiated with an initial count of three and is configured to decrement towards a termination count or value of zero. More specifically, in response to each subsequent feature game outcome, the outcome counter 422 is configured to decrement unless a reset condition is detected within the subsequent feature game outcome as described herein. In some embodiments, the advancement towards the termination count is in response to feature game outcomes fulfilling certain predefined conditions, such as the absence of any new value-bearing symbols. In other embodiments, the initial count, the terminal count, and/or the operation or set of operations governing updates to the counter 422 may be adjusted to adapt to the particular configuration and theme of the feature game. For example, the counter 422 may be initiated at an initial count of zero and configured to increment towards a termination count of three.

Figure 6G:
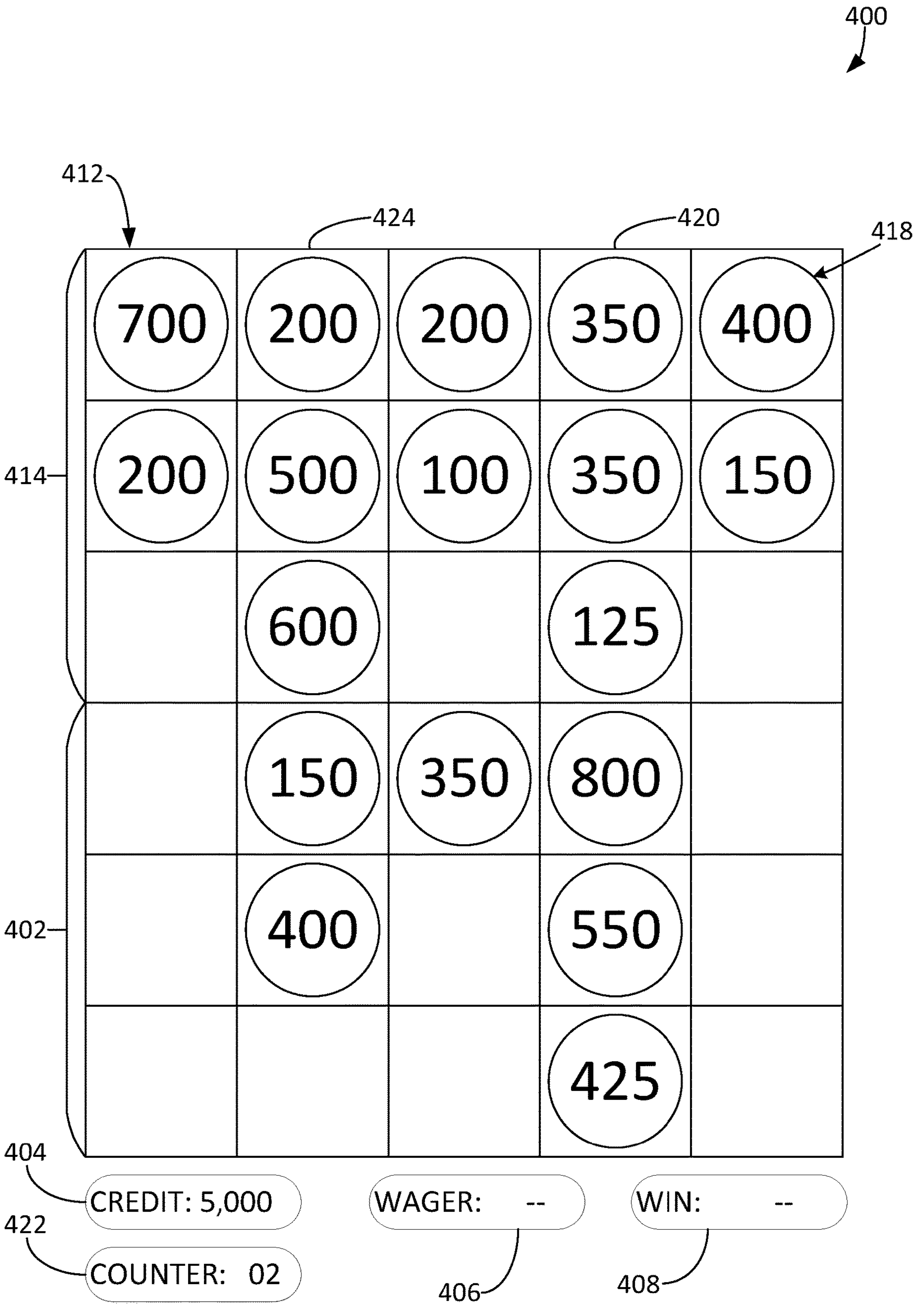
FIG. 6G is the game interface of FIG. 6A in a seventh state with additional value-bearing symbols occupying the symbol array and the outcome counter updated, according to an embodiment of the present invention.

FIG. 6G depicts the game interface 400 in a seventh state following the sixth state. In the seventh state, a subsequent feature game outcome is presented following the outcome shown in the sixth state. In the seventh state, new value-bearing symbols 421 have been added to the second and third columns, and the symbols 419 from the sixth state have been locked into the array 412. The second column is one locked symbol away from achieving the respective award threshold. In certain embodiments, subsequent outcome sequences (e.g., the spin and stop of reel strips) may include additional or enhanced presentation elements and/or animations to emphasize the near-win condition of the second column.

In addition to the changes to the array 412 and corresponding symbols, the outcome counter 422 is updated to indicate the current count has decremented. In the example embodiment, the reset condition associated with the outcome counter 422 includes detecting whether or not a subsequent award threshold has been achieved by the subsets of the array 412. In the illustrated embodiment, no new award threshold has been achieved since the outcome counter has been initiated, therefore the outcome counter 422 is decremented. In certain embodiments, the feature game outcomes may include special symbols that reset, hold, or otherwise manipulate the current count of the outcome counter 422.

Figure 6H:
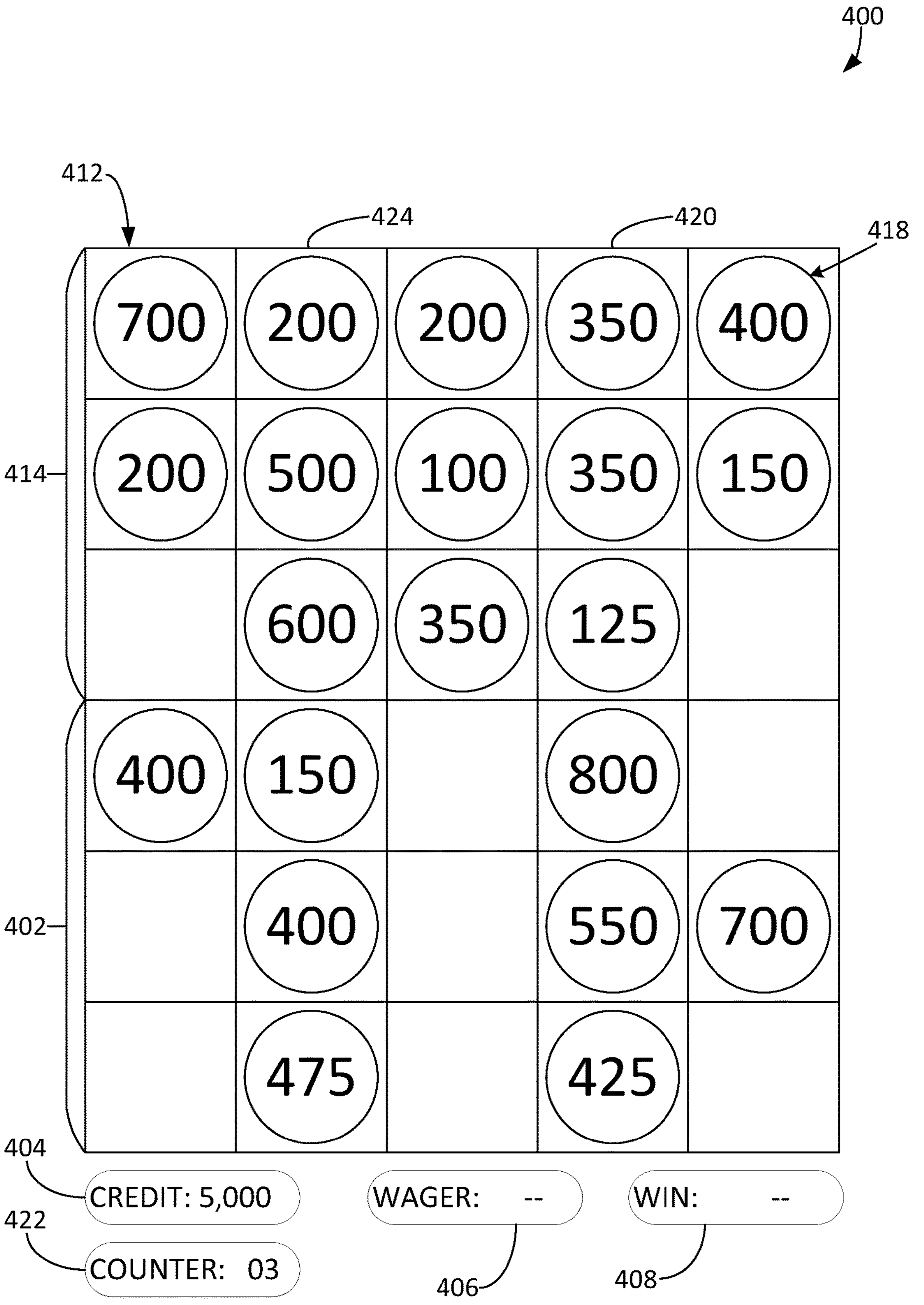
FIG. 6H is the game interface of FIG. 6A in an eighth state with a second column filled with value-bearing symbols and the outcome counter reset, according to an embodiment of the present invention.

FIG. 6H depicts the game interface 400 in an eighth state following the seventh state. The eighth state depicts a feature game outcome following the feature game outcome shown in the seventh state. The eighth state includes three new award symbols 423, and the symbols 421 (shown in FIG. 6G) are now locked into the respective columns of the array 412.

In the illustrated embodiment, in response to the feature game outcome of the eighth state, the game-logic circuitry detects a new award threshold has been achieved for the second column. As a result, the game-logic circuitry identifies the second column as a second awarding column or subset, where a corresponding award sequence is presented or to be presented for the second awarding column and the locked symbols therein.

In the example embodiment, the new awarding column 424 activates the reset condition of the outcome counter 422. As a result, the outcome counter 422 has been reset to a reset value of three. In other embodiments, the reset value is different from the initial value. In certain embodiments, the reset value may be dynamically determined in response to the prior count of the counter 422, the game event or condition associated with the reset condition, and/or a random determination (e.g., a reset value randomly selected from a range or set of available reset values). In one example, achieving multiple award thresholds within a single feature game outcome may increase the reset value relative to an outcome within a single new award threshold being achieved. Play of the feature game continues until the outcome counter reaches or exceeds the termination count or another termination condition is detected.

In one or more embodiments, the additional termination conditions may include filling the entire expanded symbol array 412 with locked symbols 418. In response to detecting this termination condition, additional or enhanced awards may be provided, and the presentation assembly may present a corresponding award sequence based on this termination condition. In one example, additional award values, multipliers, and/or other enhancements are applied to the locked symbols. In another example, additional symbol positions may be added for extended play of the feature game. In yet another example, a jackpot award may be provided, selected, or available for award in response to filling the symbol array 412 with the locked symbols 418.

Figure 6I:
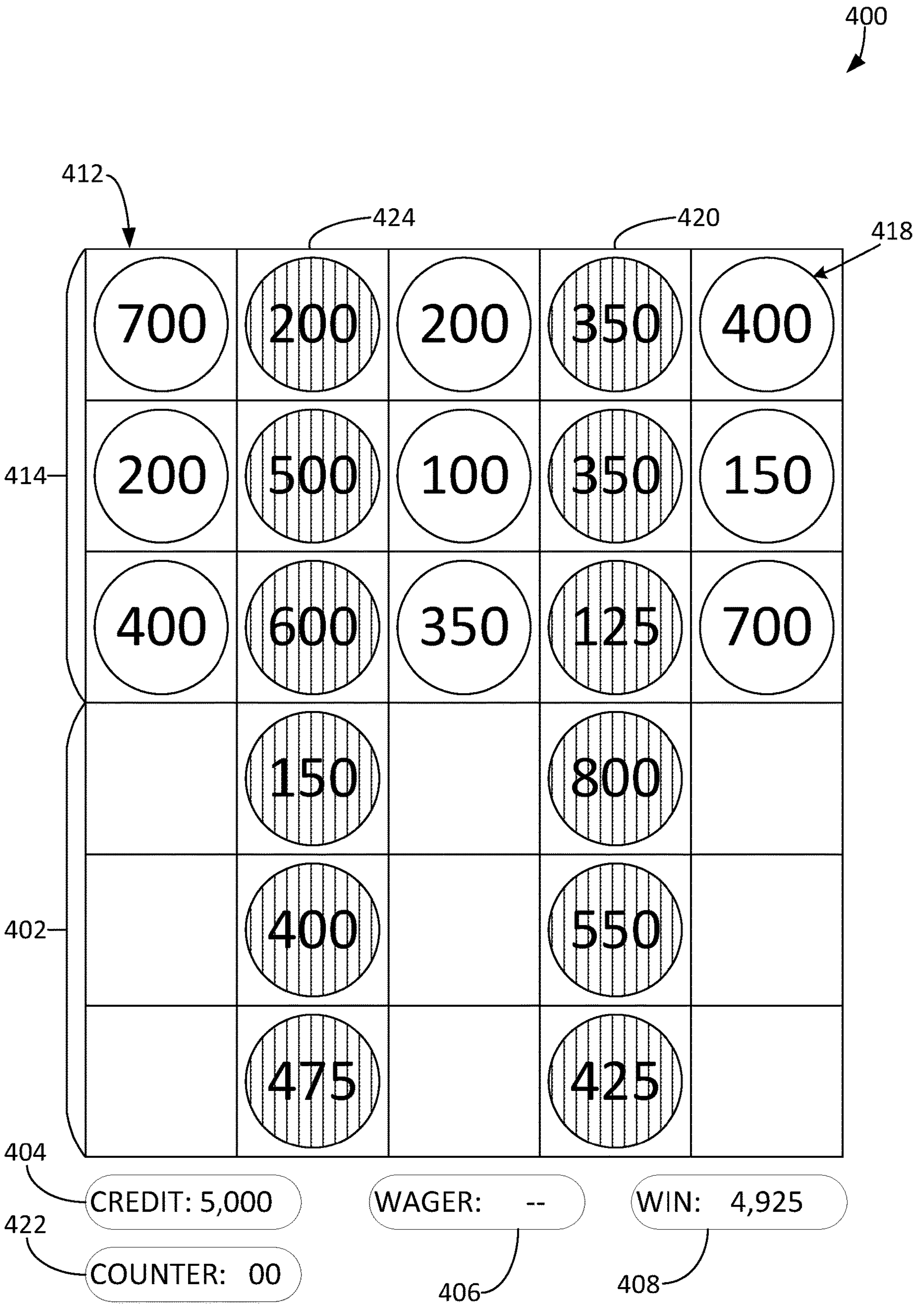
FIG. 6I is the game interface of FIG. 6A in a ninth state with the outcome counter reaching a termination value and an award sequence initiated for the columns reaching respective award thresholds of value-bearing symbols, according to an embodiment of the present invention.

FIG. 6I depicts the game interface 400 in a ninth state following the eighth state. The ninth state depicts an example award sequence following a termination condition with the outcome counter 422. That is, through several subsequent feature game outcomes following the eighth state, no new award thresholds were achieved, and the outcome counter 422 was decremented to the termination count of zero as visually indicated in the ninth state. Accordingly, the presentation assembly is configured to present an award sequence at least using the game interface 400 for the two awarding columns 420, 424.

In the example embodiment, the values of each locked value-bearing symbol 418 within the two awarding columns 420, 424 are aggregated together and provided as an aggregate award within the award sequence. The award sequence may include one or more animations, presentation elements, and/or changes to presentation elements to visually indicate the aggregate award to the player. In the illustrated example, the awarded symbols are visually changed (as indicated by the shading shown in FIG. 6I), and the award meter 408 is updated in response to the aggregation of the award indicia. The aggregate award, which is indicated by the award meter 408 in the ninth state, may then be applied to the credit balance associated with the gaming session. Such an update to the credit balance is reflected by the presentation assembly by updating the credit meter 404.

The locked symbols 418 within the subsets or columns that did not achieve the respective award thresholds are not awarded and may be removed from the game interface 400. In certain embodiments, these symbols 418 may still be selectively awarded within the award sequence in response to certain game events. In one example, the awarding subsets include a picking modifier symbol, where the modifier symbol is replaced by a value-bearing symbol (or set of symbols) from non-awarding subsets. In such an example, the replacement symbol may be the highest value symbol in the non-awarding subsets, an adjacent symbol, a symbol having an award value determined at least partially as a function of a set of locked symbols, and the like.

Following the award sequence of the ninth state, the feature game is concluded, the game interface 400 transitions back to a base game state. For example, the additional symbol positions 414 are removed to transition from the expanded symbol array 412 back to the base symbol array 402, and the outcome counter 422 is removed from the interface 400. Other suitable changes, such as removing locked symbols, may be performed within a transition sequence presented by the presentation assembly. In other embodiments, the award sequence is not presented at the conclusion of the feature game, but rather is presented during the feature game. For example, at least a portion of the award sequence may be presented after each awarding threshold is achieved. In such embodiments, the transition sequence to the base game may be presented without the award sequence, or only a portion of the award sequence is presented at the conclusion of the feature game.

It is to be understood that, although FIGS. 6A-6I describe the features with respect to value-bearing symbols, other symbols may be incorporated within the feature game, including other lockable symbols. In at least some embodiments, modifier symbols are used within the feature game. The modifier symbols may be associated with modifiers such as, and without limitation, multipliers, award values, free spins, reset conditions for the counter 422, jackpot trigger symbols, array modifiers (e.g., adding or removing symbol positions from the array), and the like. Some modifier symbols are configured to apply the corresponding modifier immediately, while other modifier symbols may be lockable in the array similar to the value-bearing symbols. For example, a multiplier symbol may be locked into the array for use in the award sequence to modify one or more award values, or the next value-bearing symbol occupying the position of the multiplier symbol is combined with the multiplier to enhance the respective award value. In another example, one or more types of modifier symbol are configured to add additional value-bearing symbols to the array and/or rearrange previously locked symbols. In such an example, one modifier symbol may add between one and three value-bearing symbols to the array, while another modifier symbol moves locked symbols from the subset with the least progress towards the award threshold to a subset that is the closest to the award threshold. Other suitable modifier symbols, including those described elsewhere herein, may be used to enhance the feature game.

Figure 7:
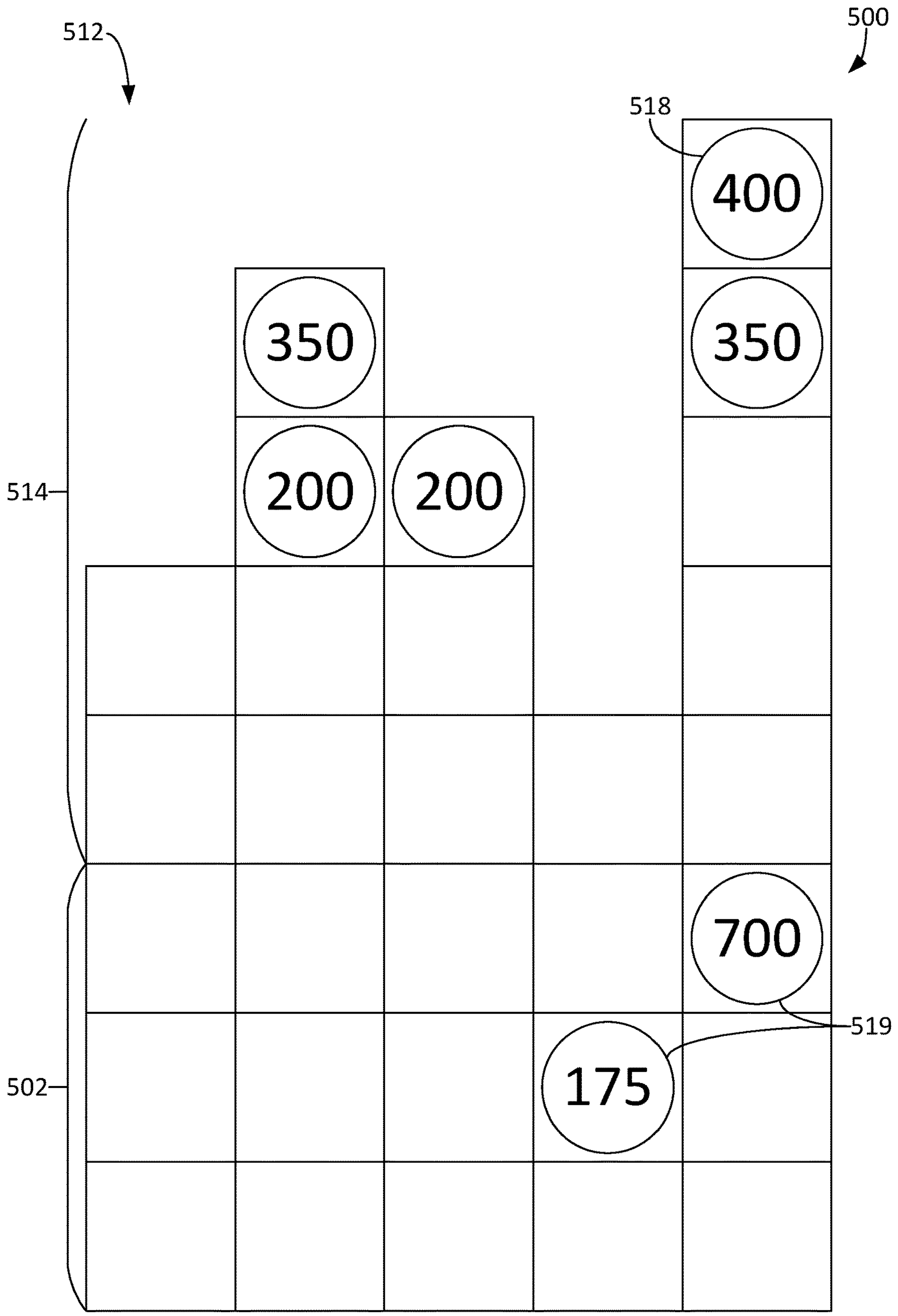
FIG. 7 is an example game interface of a gaming system with variable column expansion and dynamically-sorted locked value-bearing symbols, according to an embodiment of the present invention.

FIGS. 6A-6I depict the expanded symbol array as a uniform set of subsets, where each subset has the same number of symbol positions and the same award threshold. However, the embodiments of the present disclosure are not limited to such configurations. That is, each subset may be independent of other subsets such that the size (i.e., number of symbol positions within) and/or award threshold are different relative to one or more remaining subsets. FIG. 7 depicts an example game interface 500 similar to the game interface 400 shown in FIGS. 6A-6I illustrating a non-uniform array for the feature game.

The interface 500, similar to the interface 400 includes an expanded symbol array 512 including a base symbol array 502 and a plurality of additional symbol positions 514. The array 512 includes a plurality of locked symbols 518 locked at the top of each column and new symbols 519 occupying the base array 502 from a feature game outcome.

The array 512 is divided into a plurality of subsets, which are defined as the columns of the array 512. Unlike the array 412 in FIGS. 6A-6I, each column of the array 512 has a different number of symbol positions. The non-uniform expansion may be random, based on game events or conditions, predefined, and/or based on player input. The expansion may be determined for each column independently or the array 512 as a whole.

With respect to random expansion, a set or range of symbol position expansion may be available for each column, and one or more random values are used to select the symbol expansion for each column. Another example of random expansion includes randomly allocating a number of additional symbol positions 514 between the columns, where the number of additional symbol positions is predefined or randomly determined.

Game event-based expansion may include, for example, expanding based on the trigger event or a modifier symbol detected in the feature game outcomes. In one particular example, each trigger symbol in a column expanded the column by an additional symbol position (e.g., a column with two trigger symbols would expand two more symbol positions relative to a column with no trigger symbols).

Predefined expansion may include selecting the column expansion from a predefined set or sequence of array configurations. The selection may also be predefined (e.g., an order of the selection is predetermined for a plurality of feature game instances) or at least partially random. In some embodiments, the same number of additional symbol positions 514 are added to each column, but the base symbol array 502 has a non-uniform size that carries into the expanded symbol array 512.

In certain embodiments, the player may be provided the option to configure the expansion of the array 512 to balance the reward of potentially greater awards with the risk of increased award thresholds. Player input may be provided for each column, a portion of the columns, or the array as a whole (e.g., selecting from a predefined set of array configurations or allocating additional symbol positions 514 manually). The presentation assembly may be configured to prompt the player to provide the corresponding input at or prior to the initiation of the feature game.

The above array expansion examples are provided for exemplary purposes only and are not intended to limit the disclosure to the above examples. In certain embodiments, combinations of the above examples may be used. For example, random selection of predefined array configurations or alternating expansion schemes between feature game instances may be used.

The foregoing systems and methods include, in at least some embodiments, a feature game with a dynamic game length or duration. For example, in FIGS. 6A-6I, the feature game is configured to continue indefinitely until an initial award threshold is achieved, which causes the outcome counter to be initiated. The outcome counter is associated with a reset condition and a termination condition, where the reset condition extends the feature game, and the termination condition concludes the feature game. In certain embodiments with an extendable or otherwise dynamic feature game duration, the feature game is configured to always have an achievable reset condition. That is, the game events and/or game conditions that define at least one reset condition (e.g., a certain symbol occurring in a feature game outcome, achieving a new award threshold, etc.) is achievable during a feature game outcome or at least is achievable within the remaining duration of the feature game. For example, with respect to the foregoing systems and methods, at least one new award threshold is achievable prior to the outcome counter reaching the termination count. In other embodiments, the feature game may be configured to include game states without a possible reset condition within the remaining duration of the feature game, and therefore the feature game is played until the termination condition is detected.

The achievable reset condition may be provided within the feature game through several game functions. In some embodiments, the feature game includes at least one reset condition that is achieved within a single feature game outcome irrespective of the state of the feature game (e.g., the number of locked symbols and/or available award thresholds). Additionally or alternatively, the feature game is configured to add, change, or remove one or more game elements through the feature game to ensure a reset condition is achievable. For example, as described in detail herein, the game-logic circuitry of a gaming system is configured to detect whether or not a reset condition is achievable within the feature game based on the current state of the feature game and the remaining feature game duration. In such an example, if a reset condition is not available within the remaining feature game duration, the game-logic circuitry automatically triggers a reset condition and/or a game adjustment process that makes at least one reset condition achievable within the feature game.

Figure 8:
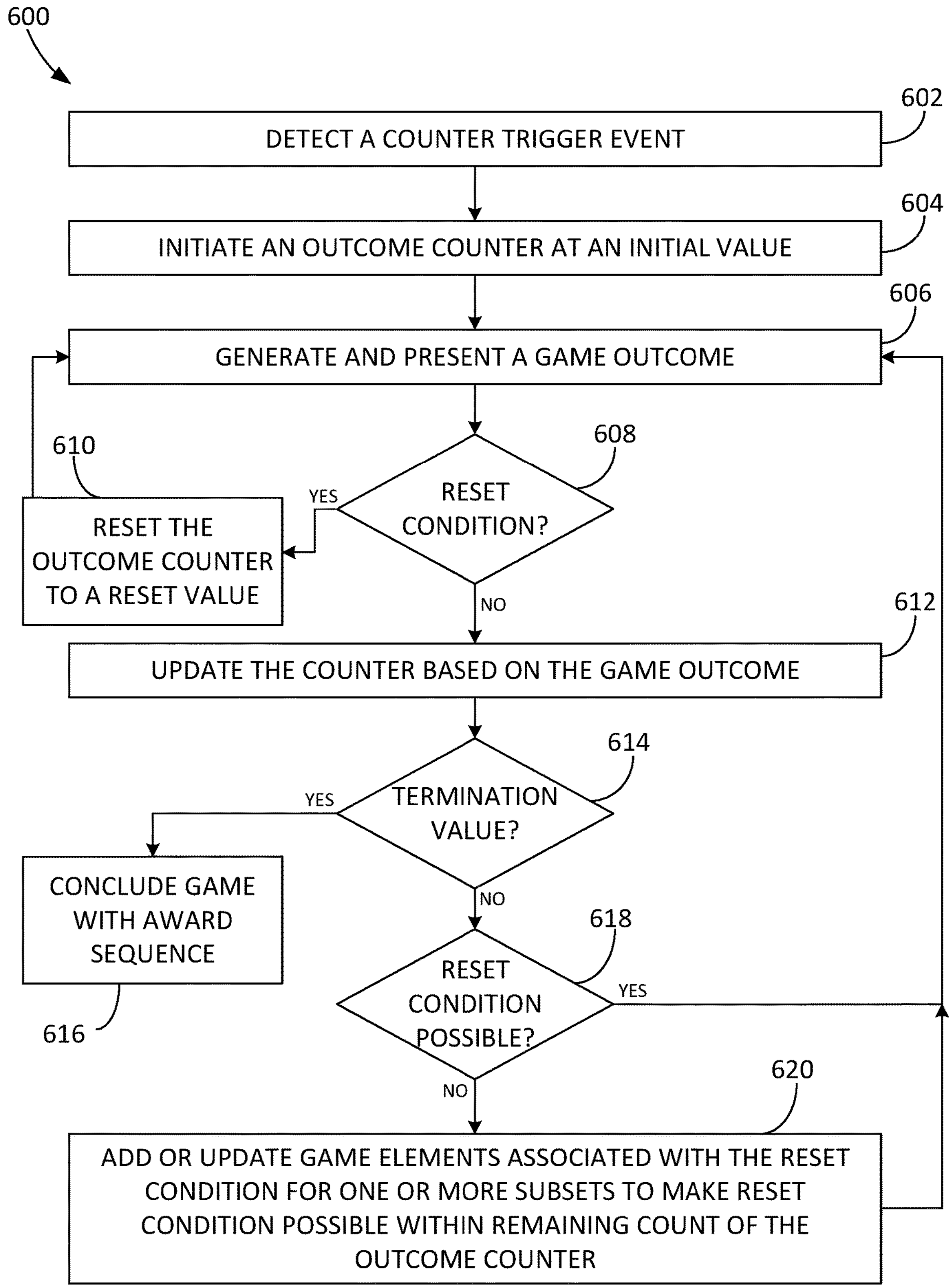
FIG. 8 is a flow diagram of an example method of operating a gaming machine to adjust a limited duration game feature to make a game event achievable within the remaining duration, according to an embodiment of the present invention.

FIG. 8 depicts a flow diagram of an example method 600 for operating a gaming system within a dynamic feature game. The feature game may be similar to the feature games described above or a different feature game configuration (e.g., without the expandable symbol array, locked symbols, etc.). In the example embodiment, the method 600 is executed using game-logic circuitry of the gaming system in communication with a presentation assembly of a gaming machine. In other embodiments, the method 600 includes additional, fewer, or alternative steps and/or is executed by a different configuration of devices, including the steps and devices described elsewhere herein.

The method 600 is performed within an initiated feature game, which includes one or more game elements presented within one or more game interfaces by the presentation assembly to depict feature game outcomes. In one example, the feature game includes a symbol array of symbol positions that are selectively populated with randomly selected symbols. In another example, the feature game includes one or more symbol-bearing wheels that are animated to spin and randomly select one or more symbols presented on the wheel. In a further example, the feature game includes a virtual set of dice that are animated to roll to generate feature game outcomes.

In the example embodiment, at step 602, the game-logic circuitry detects a counter trigger event within the feature game. The counter trigger event may be one or more game events, game conditions, or combinations thereof that occur within the feature game or may occur within the initiation of the feature game. That is, the steps described herein are performed at the beginning of a feature game instance. In embodiments in which the counter trigger event occurs within the feature game, at least one feature game outcome may precede the step 602 such that the feature game initially has no limited, predetermined duration or the feature game does not initially have a counter-based termination condition (i.e., other termination conditions of the feature game may be active, such as winning a progressive jackpot award automatically concluding the feature game). In one example, the counter trigger event is detecting or identifying an initial awarding subset of a plurality of symbol position subsets based on a number or value of locked symbols within the identified subset.

At step 604, in response to detecting the counter trigger event, the game-logic circuitry initiates an outcome counter at an initial value and causes the presentation assembly to present the outcome counter within a game interface of the feature game. In the example embodiment, the outcome counter is configured to increment or decrement towards a termination count from the initial value or count in response to each feature game outcome. In other embodiments, the outcome counter is updated in response to game outcomes including or failing to include certain game events or conditions and/or is updated using a different suitable mathematical and/or logical operation.

At step 606, in response to initiating the outcome counter, the game-logic circuitry is configured to generate and cause the presentation to present a feature game outcome. The feature game outcome includes one or more random determinations (e.g., generating random values via a random number generator of the game-logic circuitry) that are compared to stored values, weight parameters, and other suitable variables and/or integrated within one or more functions that indicate a particular state of the game elements within the feature game. For example, an array-based feature game randomly selects a set of symbols to occupy the symbol array by comparing one or more random values to one or more weighted tables and selecting a corresponding symbol, set of symbols, reel stop position, and the like from the weighted table based on the comparison.

In response to generating the feature game outcome, the game-logic circuitry executes one or more game determinations based on the current state of the feature game, particularly in response to changes or additions to the game state from the feature game outcome. For example, and without limitation, the game-logic circuitry is configured to determine any winning symbols or symbol combinations, locking certain symbols, identify any newly achieved awarding threshold, and the like. Other outcome determinations are described herein with respect to steps 608-620, which occur prior to a subsequent feature game outcome. The game outcome determinations may be configured to be performed serially (via a predefined order of determinations, according to the available resources of the gaming system, etc.), in parallel with each other, or combinations thereof. That is, the steps 608-620 may be performed in a different sequence (including in parallel) in other embodiments. The determinations may be performed in an order different from the resulting outcome sequence presented by the presentation assembly.

At step 608, the game-logic circuitry determines whether a reset condition associated with outcome counter is present within the feature game outcome. The reset condition is any suitable game event, game condition, or combinations thereof according to the particular game configuration of the feature game. In one example, the reset condition includes detection of any new awarding subsets of plurality of symbol positions (e.g., a symbol array). In another example, the reset condition includes detecting a particular symbol or combination of symbols within the feature game outcome, such as a reset symbol. One or more types of reset conditions may be active within the feature game. It is to be understood that an "active" reset condition may not necessarily be achievable within the current feature game outcome yet is also not disabled or inactive such that the game-logic circuitry ignores or bypasses the reset condition and any corresponding steps to determine the reset condition. In certain embodiments, certain reset conditions may be selectively inactive through the feature game instance.

To determine whether or not a reset condition exists, the game-logic circuitry compares the state of the feature game (including the changes introduced from the feature game outcome) to stored parameters associated with the reset condition. For example, in an embodiment with a reset condition for new awarding subsets, the game-logic circuitry is configured to store predefined parameters that outline the characteristics of the awarding subsets (e.g., a minimum number of locked symbols within an awarding subset) for comparison to each subset and persistent parameters that indicate which subsets are already awarding subsets.

If a reset condition is detected, the game-logic circuitry is configured to reset the outcome counter to a reset value at step 610, thereby extending the duration of the feature game. The reset value may be the initial value of the outcome counter or another suitable value. The reset value may be predetermined, at least partially random (e.g., randomly selected from a range of reset values), functionally determined, or manually defined in response to player input. The remaining outcome determinations proceed prior to the next feature game outcome. In certain embodiments, determining a reset condition is present causes one or more other outcome determinations associated with the outcome counter (e.g., steps 614 and 618 described herein) to be bypassed (i.e., the game-logic circuitry does not perform all of the steps of the determination).

If no reset condition is determined to be present at step 608, the game-logic circuitry updates the outcome counter based on the feature game outcome at step 612. In at least some embodiments, the outcome counter is updated irrespective of the current state of the feature game and is incremented or decremented towards a termination value. In other embodiments, the outcome counter is updated in response to outcomes including certain game events and/or conditions. In certain embodiments, the outcome counter may be updated using different suitable mathematical and/or logical operations. The presentation assembly is configured to update any presentation elements associated with the outcome counter in response to the updated count of the counter.

At step 614, the game-logic circuitry determines whether or not a termination condition associated with the outcome counter is present. In particular, the game-logic circuitry compares the current count of the outcome counter to a predefined termination value stored by the game-logic circuitry, where meeting or passing the termination value with the current count indicates a termination condition is active. The game-logic circuitry may be configured to determine other termination conditions in place or in addition to the count comparison for the outcome counter. For example, certain awards (e.g., jackpot awards) may automatically conclude the feature game when triggered and awarded. Some termination conditions may be selectively activated or inactivated during the feature game such that the game-logic circuitry does not perform the corresponding determination for any inactive termination conditions. The termination conditions may be set inactive if the corresponding game events or conditions are not possible within the feature game outcome (e.g., the determination at the step 614 is inactive prior to the outcome counter being initiated at step 604).

If the termination value has been met or exceeded by the current count, the game-logic circuitry is configured to conclude the feature game at step 616. More specifically, the game-logic circuitry is configured to cause the presentation assembly to present an award sequence for any awarding subsets and/or other suitable awards and a transition sequence that updates the game interface to reflect the change from the feature game to a base game, other game component, or the conclusion of the gaming session.

If the termination value has not been met or exceeded based on the comparison at the step 614, a subsequent determination is performed at step 618. More specifically, the game-logic circuitry determines whether or not a reset condition is possible within the remaining duration of the feature game as defined by the outcome counter. The game-logic circuitry compares the parameters of the reset condition to the current state of the feature game and the current count of the outcome counter to extrapolate any possible reset conditions. In one example, if the reset condition includes collecting a threshold number of reset symbols, the game-logic circuitry determines a maximum number of reset symbols that can be collected within the remaining feature game outcomes, adds the determined number of symbols to the current count of reset symbols, and compares the projected number of possible reset symbols to the threshold number to determine whether or not the reset condition is possible. In another example, where new awarding subsets define the reset condition, the game-logic circuitry compares a projected maximum count or state for any non-awarding subsets to the respective awarding conditions or events to determine if any non-awarding subsets can be awarded. Other suitable means of determining possible reset conditions may be used according to the particular configuration of the feature game.

If any reset conditions are possible, the feature game continues with a subsequent feature game outcome at step 606. However, if no reset conditions are possible within the remaining duration of the outcome counter, the method 600 progresses to step 620 to adjust the state of the feature game to make at least one reset condition possible within the remaining duration of the feature game. In the example embodiment, the game-logic circuitry adds, updates, or otherwise changes one or more game elements associated with the reset condition for one or more subsets to make at least one reset condition possible within the remaining count of the outcome counter. For example, value-bearing symbols may be added to one or more non-awarding subsets to automatically achieve (or make achievable) a reset condition, or the symbol positions without locked symbols of a non-awarding subset are reduced to make the reset condition achievable. It is to be understood that "updating" a game element may include changing a corresponding reset condition and/or other parameters of the game element. The presentation assembly is configured to update the game interface accordingly.

In some embodiments, the step 620 automatically triggers a reset condition, and the outcome counter is reset. In other embodiments, the step 620 only makes a subsequent reset condition possible within the remaining count of the outcome counter. The feature game continues to a subsequent feature game outcome at step 606. The method 600 repeats until a termination condition is detected at the step 614, thereby concluding the feature game at the step 616.

FIGS. 9A-9D depict an example game interface 700 of a feature game configured to include reset condition determinations similar to the method 600 shown in FIG. 8. The game interface 700 is presented by a presentation assembly of a gaming machine (e.g., the machine shown in FIGS. 1 and 2) in communication with game-logic circuitry to perform the functionality described herein.

The interface 700 is the same or similar to the interface 500 shown in FIGS. 6A-6I unless otherwise specified herein. That is, with respect to FIG. 9A, the interface 700 includes a base symbol array 702, a credit meter 704, a bet meter 706, an award meter 708, an expanded symbol array 712, additional symbol positions 714, a plurality of locked value-bearing symbols 718, an awarding column or subset 720, and an outcome counter 722. The expanded symbol array 712 includes both the base symbol array 702 and the additional symbol positions 714. Each symbol position is configured to receive locked symbols, while the base symbol array 702 is further configured to receive new symbols from feature game outcomes. The subsets or columns of the expanded array 712 are associated with respective awarding thresholds, where filling a given column with locked symbols meets the award threshold, thereby converting the column from a non-awarding column to an awarding column. In other embodiments, the interface 700 may include additional, fewer, or alternative presentation and/or game elements, including those described elsewhere herein.

Figure 9A:
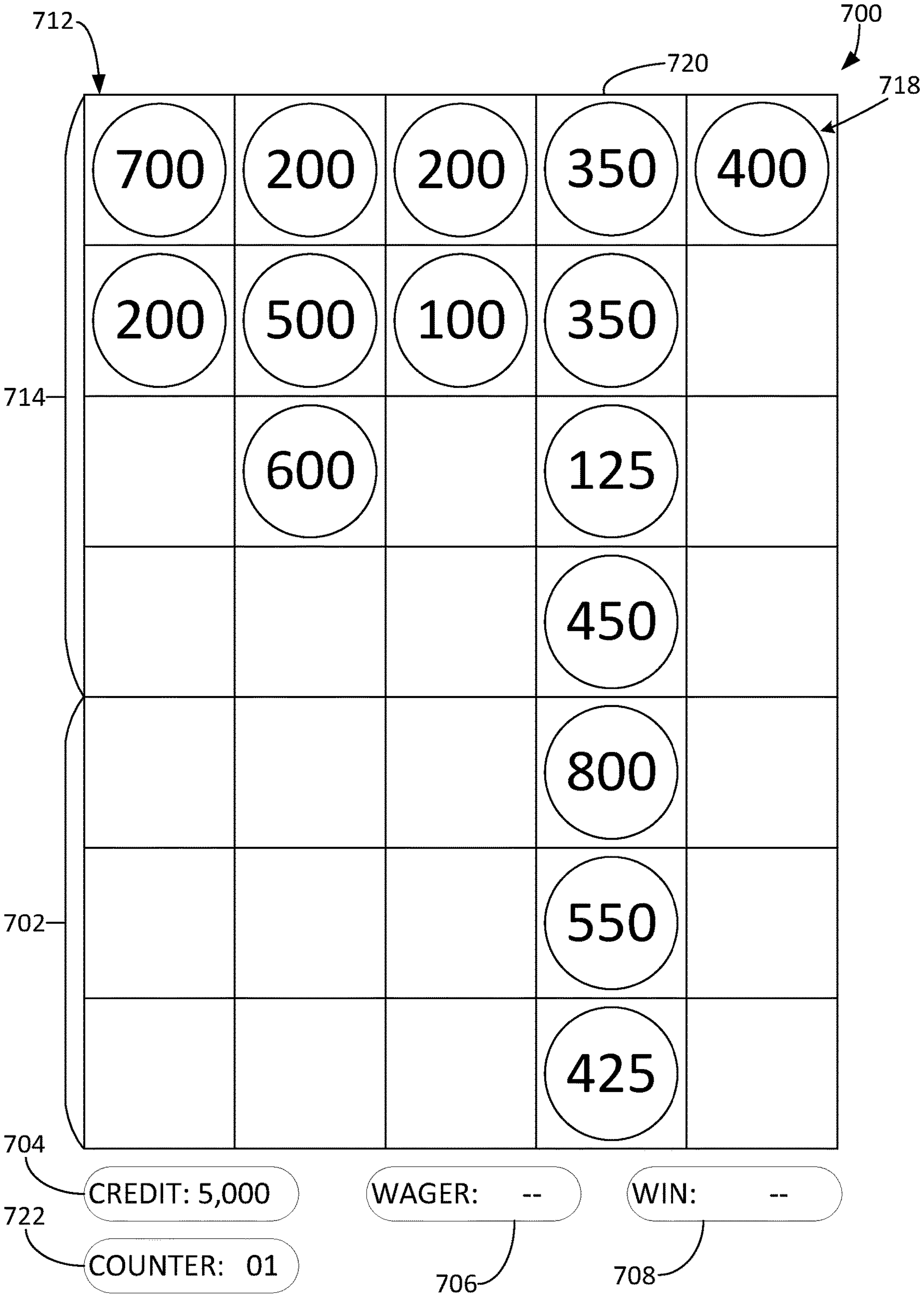
FIG. 9A is an example game interface of a gaming system in which a reset condition in not achievable within the remaining count of an outcome counter, according to an embodiment of the present invention.

FIG. 9A depicts the interface 700 in a first state. In the first state, one column has already been identified as an awarding column 720 such that the outcome counter was reset on a previous feature game outcome. The outcome counter 722 is configured to decrement towards zero, and the remaining count is one. In reviewing the remaining non-awarding columns (i.e., all columns except for the awarding column 720), no further awarding thresholds are possible within the remaining duration of the outcome counter 722, and by extension, no further reset condition is available. New symbols are limited to the base symbol array 402, which includes three symbol positions per column. Accordingly, the maximum number of new symbols in a given column per feature game outcome is three in the illustrated embodiment. One feature game outcome remains, and every non-awarding column requires four or more new locked symbols to achieve the respective award threshold.

The game-logic circuitry is configured to detect the lack of achievable reset conditions through one or more outcome determinations. In one example, the outcome determination for detecting any reset conditions may also include determining whether or not the reset conditions are achievable (e.g., by comparing a projected maximum possible number of locked symbols in each column to the respective award thresholds). In another example, the reset condition achievability is monitored through a separate outcome determination, where a projected maximum number of locked symbols of each non-awarding column is generated and compared to the respective awarding threshold. In a further example, the outcome determination associated with the possible reset conditions may be limited to prior to a final feature game outcome as indicated by the outcome counter 722 such that the outcome determination is ignored or inactive during any prior feature game outcomes. In such an example, the underlying logic of the outcome determination may be streamlined to determine whether or not any additional symbol positions 714 are unoccupied to determine if the reset condition is possible for each column. That is, because the determination is performed with a single feature game outcome remaining, the maximum number of new symbols is equal to the number of symbol positions from the base array 702 and cannot fill both the base symbol position and one or more additional symbol positions 714 within a single feature game outcome. In other embodiments, other suitable outcome determinations may be performed to monitor the possible reset conditions.

Figure 9B:
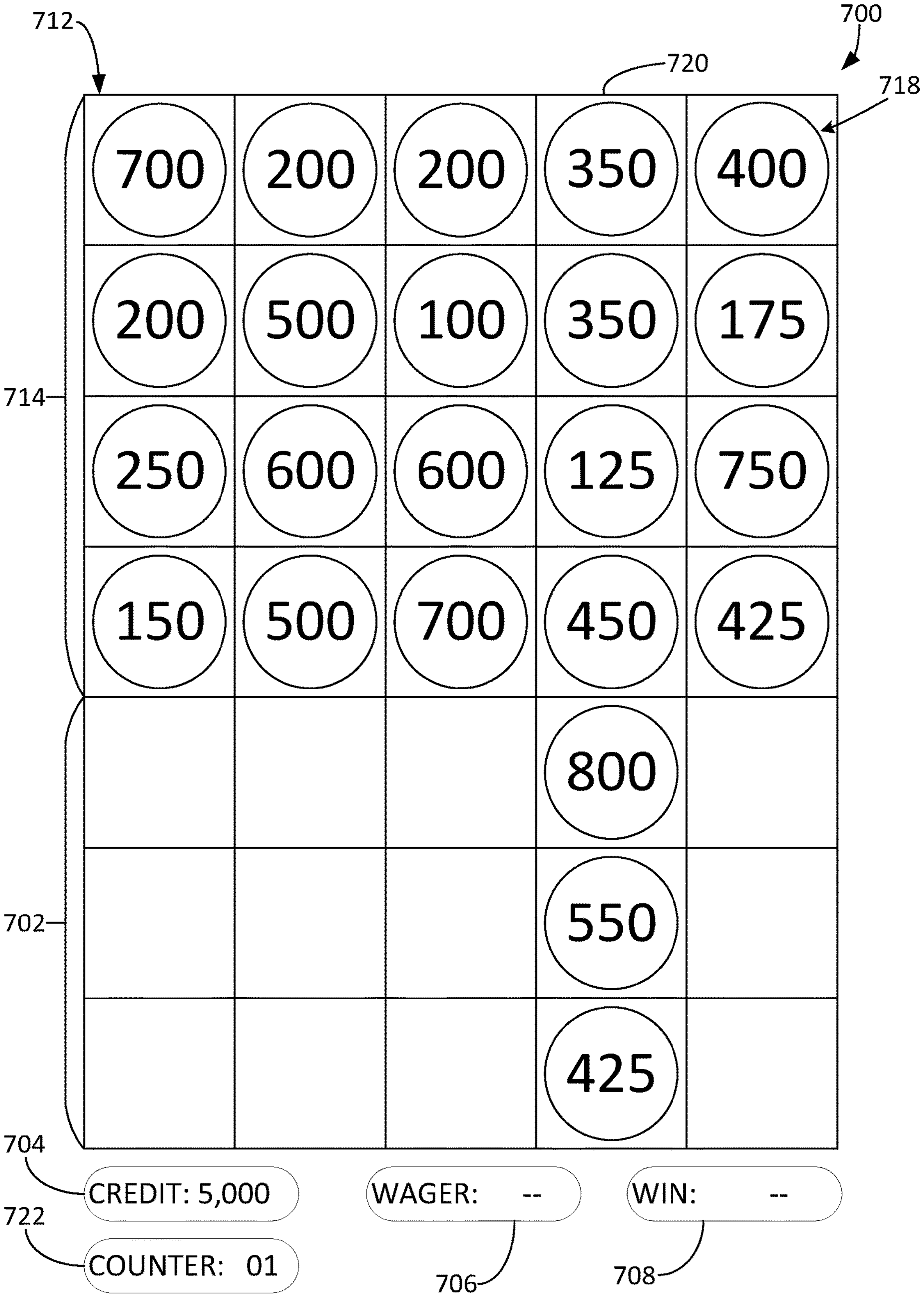
FIG. 9B is the game interface of FIG. 9A with additional value-bearing symbols and a reset outcome counter to make the reset condition achievable, according to an embodiment of the present invention.
Figure 9C:
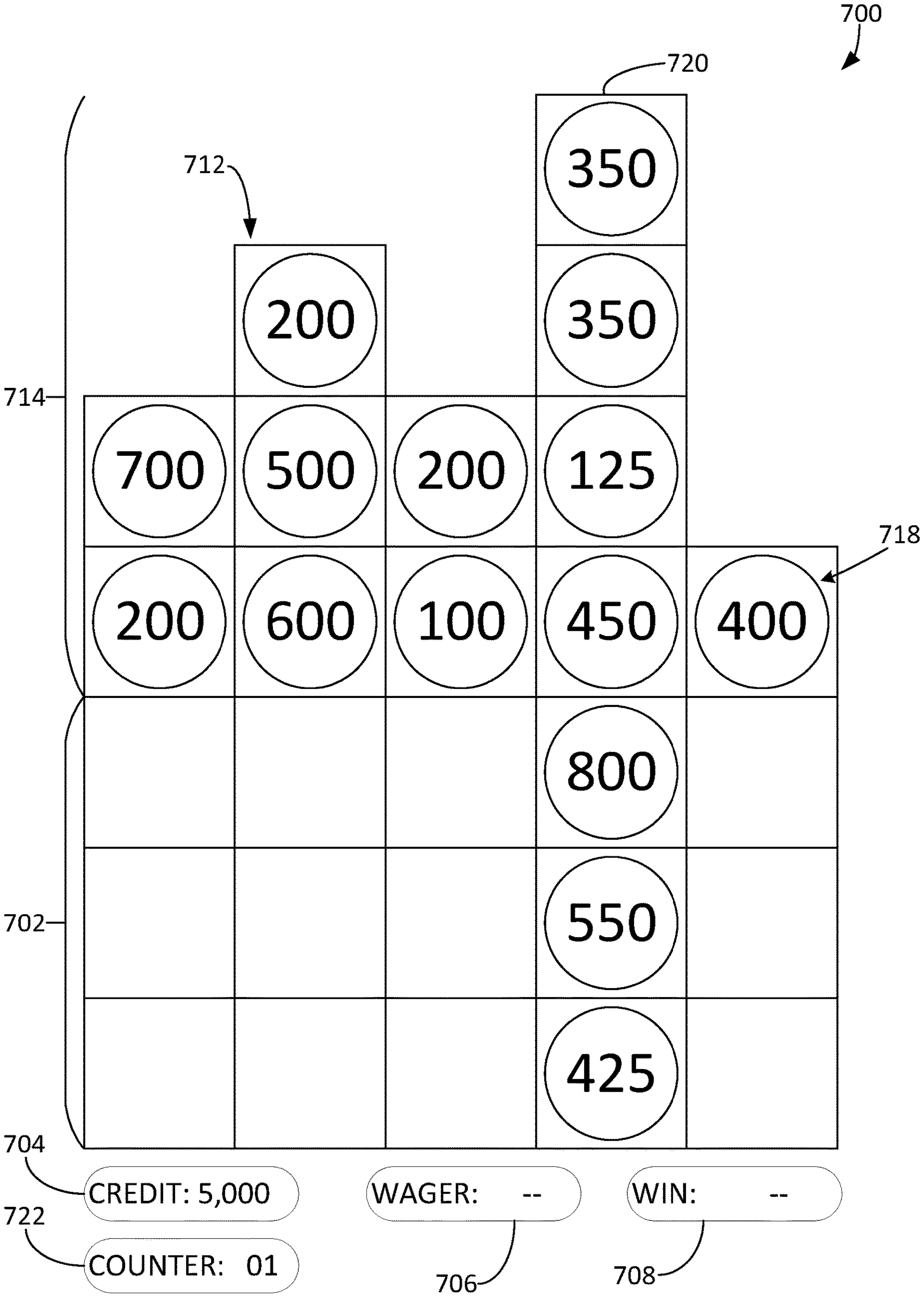
FIG. 9C is the game interface of FIG. 9A with reduced columns to make the reset condition achievable within the remaining count of the outcome counter, according to an embodiment of the present invention.
Figure 9D:
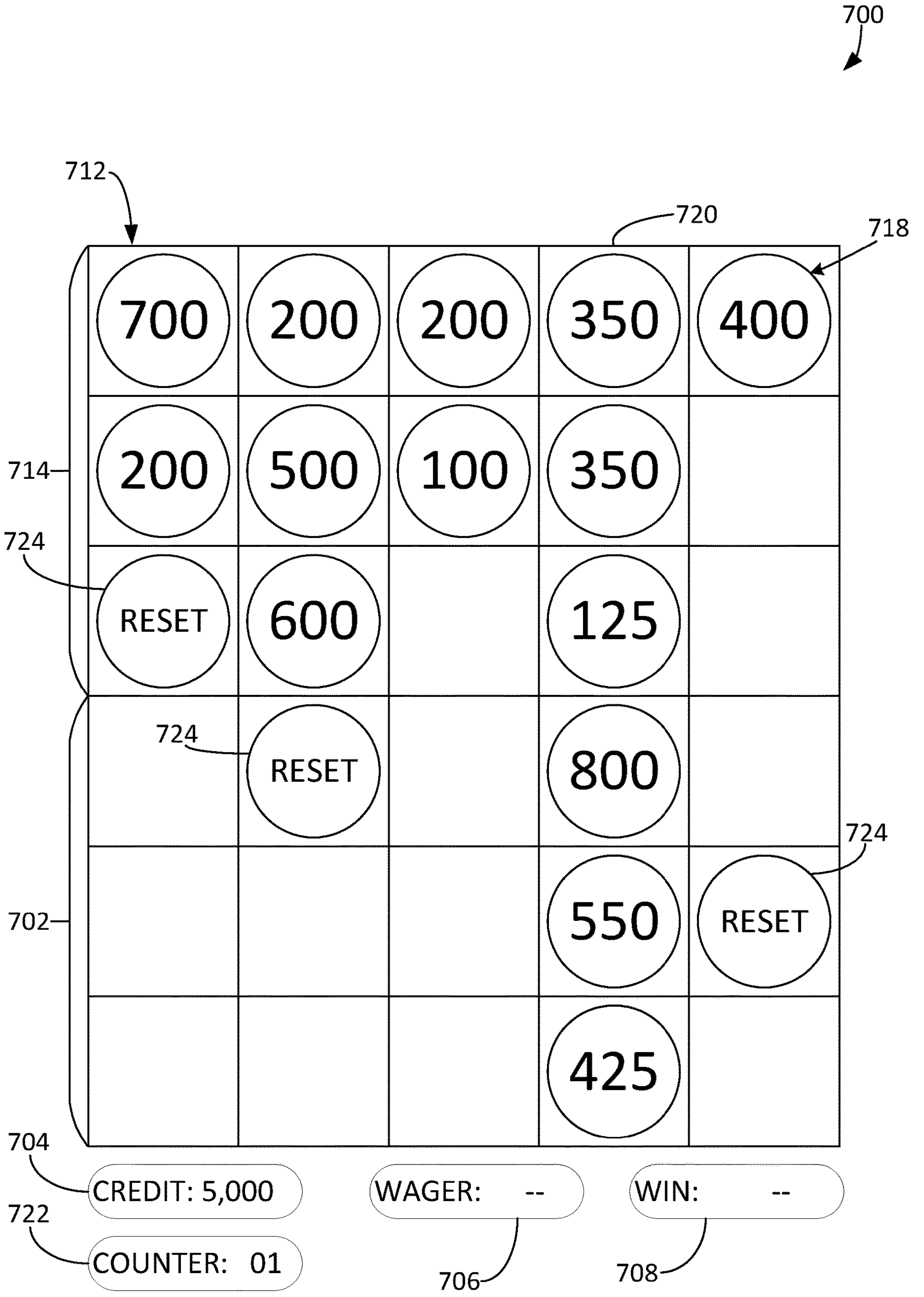
FIG. 9D is the game interface of FIG. 9A with reset symbols to make the reset condition achievable by resetting the outcome counter, according to an embodiment of the present invention.

In response to determining no reset conditions are available, the game-logic circuitry is configured to perform a game adjustment process that alters the state of the feature game to include at least one reset condition. FIGS. 9B-9D depict several examples of possible alterations to the game state to include a reset condition. It is to be understood that the examples provided herein are for exemplary purposes and are not intended to limit the scope of the present disclosure. Rather, other suitable means of adding reset conditions according to the particular configuration of a game or feature game may be used to make adjustments that are functionally similar to the adjustments described herein.

In some embodiments, the game adjustment process causes the outcome counter 722 to be reset. The reset of the outcome counter 722 may be the only change to the state of the feature game or may be combined with other adjustments, such as the adjustments described herein. In other embodiments, the game adjustment process may be configured to make the reset condition possible within the current, unaltered remaining duration of the outcome counter 722, and therefore the outcome counter 722 is not automatically reset.

FIG. 9B depicts the game interface 700 in a second state following the first state and an example game adjustment process. More specifically, in the second state, new locked value-bearing symbols 718 populate any unoccupied additional symbol positions 714. By populating all of the additional symbol positions 714, only the base symbol array 702 remains unoccupied. The base symbol array 702 can be filled with new symbols within a single feature game outcome, and therefore reset conditions are available for each non-awarding column within the remaining duration of the outcome counter 722.

The values of the new locked symbols 718 may be randomly selected similar to the new symbols generated for feature game outcomes, or the values may be copied from or otherwise based on the values of the preexisting locked symbols 718. The number of new locked symbols 718 added to the expanded array 712 may be based on the current state of the array 712 and the preexisting locked symbols 718 or may be allocated from a random or predefined number of symbols.

In certain embodiments, rather than filling all of the additional symbol positions 714, the new locked symbols 718 may be added to only to a portion of the additional symbol positions 714. In one example, the new locked symbol positions 718 are added to less than all of the remaining non-awarding columns (e.g., one column). In some embodiments, the new locked symbols 718 may also be added to the base symbol array 702. For example, one column may be filled completely with the new locked symbols 718 or filled with one remaining unoccupied symbol position.

FIG. 9C depicts a third state following the first state shown in FIG. 9A. In the third state, rather than adding more locked symbols 718, the expanded symbol array 712 is altered to make the reset conditions achievable. More specifically, unoccupied additional symbol positions 714 from the non-awarding columns (seen in FIG. 9A) are removed such that the only unoccupied symbol positions are within the base symbol array 702. These remaining unoccupied symbol positions are configured to receive new symbols within the last remaining feature game outcome, and therefore the corresponding reset conditions are achievable.

The removal of the additional symbol positions 714 includes one or more animations to move the locked symbols 718 towards the base symbol array 702. In some embodiments, rather than removing the additional symbol positions 714, the symbol positions 714 are changed to an inactive or altered state such that the inactive positions are not considered for the reset condition. In one example, the expanded symbol array 712 remains the same as the first state (shown in FIG. 9A), but the award threshold is reduced, and a corresponding number of unoccupied symbol positions are visually changed to reflect the change in the award threshold. In certain embodiments in which the additional symbol positions are changed to an inactive or altered state, the changed symbol positions may be used to perform one or more game functions, such as store additional value-bearing symbols. In one example, rather than removing the additional symbol positions 714, the additional symbol positions are converted to receive new symbols similar to the base symbol array 702. As a result, all unoccupied symbol positions can receive new symbols, thereby ensuring a reset condition is possible within one feature game outcome.

Similar to the second state shown in FIG. 9B, the unoccupied additional symbol positions 714 are removed from every non-awarding column. In some embodiments, a portion of the unoccupied additional symbol positions 714 remain. For example, the removal may be performed for a single column or a plurality of columns less than all of the remaining non-awarding columns. In certain embodiments, entire columns, occupied symbol positions, and/or base array symbol positions may be removed. In one example in which an occupied symbol position is removed, the locked symbol 718 is reallocated to another unoccupied position elsewhere within the symbol array 712. The locked symbols 718 may be reallocated without the removal of the corresponding symbol position. In one or more embodiments, one or more base array positions from one column may be allocated to a second column such that any new symbols in the base array positions are locked within the second column instead of the first column. This may be advantageous in game states where the second column is closer to achieving a reset and/or award condition in comparison to the first column.

FIG. 9D depicts a fourth state of the game interface 700 following the first state shown in FIG. 9A. In the fourth state, rather than altering the expanded array 712 or adding locked symbols 718 to the array 712, the one or more sets of available symbols for generating new feature game outcomes are altered. More specifically, in the illustrated embodiment, the one or more sets of available symbols are adjusted to include reset symbols 724, where the reset symbols 724 are associated with a reset condition.

In the example embodiment, the reset symbols 724 are held or locked into the expanded array 712 similar to the value-bearing symbols 718, and collecting three or more reset symbols causes a corresponding reset condition to be triggered. In other embodiments, the threshold number of reset symbols is greater than or less than (including one) three, and/or other suitable conditions are required (e.g., the collecting a reset symbol in each non-awarding column, collecting two or more reset symbols in a single column, etc.). In the fourth state, two reset symbols 724 have been locked into the expanded array from previous feature game outcomes (i.e., the two symbols 724 occupying the first and second columns from the left of the array 712), and one new reset symbol 724 is included in the feature game outcome shown in the fourth state. In certain embodiments, the reset symbols 724 are not locked into the array 712 such that at least a threshold number of reset symbols 724 is required within a single feature game outcome to trigger the reset condition.

The game-logic circuitry detects the third reset symbol 724 meets or exceeds the reset threshold and resets the outcome counter 724 following the fourth state, thereby extending the feature game and providing additional opportunities for the non-awarding columns to be converted into awarding columns. In response to the reset condition, the reset symbols 724 may be removed from the array 712 or converted into a different type of symbol (e.g., a value-bearing symbol, reflected by a change in indicia). In some embodiments, the reset symbols 724 may remain locked to increase the number of locked symbols in the non-awarding columns, thereby increasing the chance of reaching a new award threshold. In certain embodiments in which the reset symbols persist, the reset condition associated with the reset symbols is selectively inactive until other reset conditions are unavailable.

In at least some embodiments, the reset symbols are added in response to detecting a reset condition associated with the non-awarding columns being unachievable. The reset symbols may replace other symbols or blanks in the one or more sets of available symbols or are added to the one or more sets. In other embodiments, the reset symbols are present prior to the associated reset condition being active, but either are ignored within the feature game outcomes (i.e., treated as a blank) or provide other functionality to the feature game.

The reset symbols may be dedicated to the reset functionality or include additional functionality. In some embodiments, value-bearing symbols may be designated as reset symbols. In one example, a multi-functional symbol may be available within the one or more sets of available symbols, where the multi-functional symbol can be configured to provide the functionality of different symbol types (e.g., value-bearing symbol, modifier symbol, reset symbol, etc.). The multi-functional symbols can provide one functionality selected from a plurality of functions or a plurality of functionalities at once. The selection may be random and/or in response to certain game events or conditions. For example, any multi-functional symbols may be converted to reset symbols in response to the reset condition associated with the reset symbols becoming active or may be converted to value-bearing symbols at the conclusion of the feature game. The reset symbols may include visual characteristics to visually distinguish the reset symbols from other types of symbols. In the illustrated embodiment, the reset symbols 724 include indicia that indicates the functionality of the symbols 724.

In some embodiments, the game adjustment process described with respect to FIGS. 9B-9D may be combined with each other or otherwise available within a single feature game. In one example, a plurality of game adjustment processes is available for selection in response to detecting the lack of available reset conditions. The selection may be random, predetermined, based on game events or game conditions, and/or based on player input. For example, the player may be prompted (e.g., via the presentation assembly) to provide player input to manually select a particular type of game adjustment process.

In the embodiments disclosed herein, each value-bearing symbol may be assigned a credit value that is displayed upon the symbol. The credit value may, for example, range from a minimum credit value to a maximum credit value and be based on the total amount wagered on the game. For example, if a player wagers a minimum of 100 credits, the assigned credit value may range from 100 to 1000 credits. And if a player wagers a maximum of 500 credits, the assigned credit value may proportionately increase and thereby range from 500 to 5000 credits. In some embodiments, the assigned value may be randomly selected from a list of possible multipliers of the total amount wagered on the game, for example, 1×, 2×, 3×, 4×, 5×, 10×, 15×, 20×, 50×, and 100×. In other embodiments, the value may be pre-assigned to each value-bearing symbol as part of the reel strip layouts of the game reels. In still other embodiments, the assigned value may be randomly selected before, during, or at the conclusion of a reel spin.

While the embodiments are largely described within the context of a feature or bonus game, it is equally contemplated that the disclosed embodiments can be practiced within the context of a base game incorporating wagers. Suitable adaptations of the embodiments to base game may be used, such as continuing the base game following the termination conditions described above.

The embodiments of the present invention provide an innovative procedure for accumulating and aggregating values of symbols in a symbol array. Game-logic circuitry executing instructions in accordance with the embodiments present a visual display of spinning reels with clearly enumerated symbology that combine in readily understood arrangements to increase in value. An observer experiences excitement and anticipation as new symbols land in the array and aggregate values are summed and displayed. In stark contrast to conventional reel-spinning games in which symbol images are evaluated for winning combinations by paytable rules, the disclosed embodiments provide immediately recognizable values in WYSIWYG display configurations while adding variability as to how the values to be awarded to the player are selected and accumulated.

The value-accumulation and value-aggregation procedures may be symbol- and game-agnostic. Themes and imagery of symbols and environment may be varied with no effect on these processes. Or, if so desired, the criteria for value-accumulation and/or value-aggregation may be modified in innumerable ways to produce new visual/animation effects and exciting summation sequences.

Further benefits are realized in increased computer processing efficiency, fewer rules to be evaluated, and simpler graphical representations. For example, in a conventional paytable evaluation, overlapping payline sections require multiple evaluation steps. Often, analysis is required to determine which payline results in the highest credit total, with the lesser value paylines being discarded but only after being evaluated-all this adds to processing overhead. Special symbols like wilds, multipliers, and scatter symbols can modify paytable values and may require separate, additional evaluation according to customized rule sets. All these procedures can be inherently more complex than simple accumulation and aggregation (i.e., addition) of number values. The embodiments disclosed herein represent a win-win: simpler, almost self-explanatory graphics combined with faster, more efficient processing. The inventive value-aggregation procedure can be implemented on the vast majority of casino gaming machines without requiring upgrades or modifications.

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Block diagrams illustrate exemplary embodiments of the invention. Flow diagrams illustrate operations of the exemplary embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel or in a different sequence.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A gaming machine comprising:

a presentation assembly configured to present a graphical game interface including a symbol array comprising at least a base set of symbol positions selectively populated with randomly selected symbols within respective game outcomes; and game-logic circuitry in communication with the presentation assembly, the game-logic circuitry configured to:

in response to detecting a feature trigger event within a base game outcome, cause the presentation assembly to present an expanded set of symbol positions including the base set of symbol positions and a plurality of additional symbol positions, wherein the expanded set of symbol positions includes a plurality of symbol position subsets, each symbol position subset of the plurality of symbol position subsets positionally corresponding to a respective column of the symbol array;

cause the presentation assembly to present a plurality of feature game outcomes by animating a respective set of symbols to occupy unlocked symbol positions of the symbol array, the plurality of feature game outcomes selectively including value-bearing symbols having award indicia that visibly indicate an award value associated with the respective value-bearing symbol;

in response to any value-bearing symbols detected within the plurality of feature game outcomes, cause the presentation assembly to lock the detected value-bearing symbols within the expanded set of symbol positions, wherein any value-bearing symbol occupying a respective column of the symbol array is locked within a highest symbol position of the respective symbol position subset that is unoccupied by a preexisting locked symbol, and wherein the locked value-bearing symbols remain fixed within respective symbol positions of the symbol position subset for outcome animation sequences of any subsequent feature game outcomes of the plurality of feature game outcomes;

in response to detecting a first subset of the plurality of symbol position subsets reaching a respective award threshold of locked value-bearing symbols, initiate an outcome counter;

in response to subsequently detecting a second subset of the plurality of symbol position subsets reaching a respective award threshold of locked value-bearing symbols prior to the outcome counter reaching a termination value, reset the outcome counter to a reset value; and in response to the outcome counter reaching the termination value, cause the presentation assembly to conclude the plurality of feature game outcomes and animate an award sequence for any awarding subsets of the plurality of symbol position subsets that reached the respective award thresholds, wherein an aggregated award of the award sequence is at least partially a function of the award values of the locked value-bearing symbols of the awarding subsets.

2. The gaming machine of claim 1, wherein, for each feature game outcome of the plurality of feature game outcomes, each symbol position of the plurality of additional symbol positions is populated with a respective locked symbol, an inactive symbol, or a blank.

3. The gaming machine of claim 1, wherein the first subset includes at least one symbol position each from the base set of symbol positions and the plurality of additional symbol positions.

4. The gaming machine of claim 1, wherein the award threshold of the first subset is equal to a number of symbol positions within the first subset.

5. The gaming machine of claim 1, wherein the award threshold is the same for every subset of the plurality of position subsets.

6. The gaming machine of claim 1, wherein the game-logic circuitry is configured to cause the presentation assembly to visually distinguish awarding subsets of the plurality of symbol position subsets from non-awarding subsets within the graphical game interface in response to animating the award sequence.

7. The gaming machine of claim 1, wherein the game-logic circuitry is configured to cause the presentation assembly to visually present the outcome counter within the graphical game interface, and wherein the outcome counter is visually updated within the graphical game interface in response to each feature game outcome of the plurality of feature game outcomes.

8. A method of operating a gaming system, the gaming system comprising game-logic circuitry and a gaming machine with a presentation assembly in communication with the game-logic circuitry, the method comprising:

presenting, by the presentation assembly, a graphical game interface including a symbol array comprising at least a base set of symbol positions selectively populated with randomly selected symbols within respective game outcomes;

in response to detecting a feature trigger event within a base game outcome, presenting, by the presentation assembly, an expanded set of symbol positions including the base set of symbol positions and a plurality of additional symbol positions, wherein the expanded set of symbol positions includes a plurality of symbol position subsets, each symbol position subset of the plurality of symbol position subsets positionally corresponding respective column of the symbol array;

presenting, by the presentation assembly, a plurality of feature game outcomes by animating a respective set of symbols to occupy unlocked symbol positions of the symbol array, the plurality of feature game outcomes selectively including value-bearing symbols having award indicia that visibly indicate an award value associated with the respective value-bearing symbol;

in response to any value-bearing symbols detected within the plurality of feature game outcomes, locking, by the presentation assembly, the detected value-bearing symbols within the expanded set of symbol positions, wherein any value-bearing symbol occupying a respective column of the symbol array is locked within a highest symbol position of the respective symbol position subset that is unoccupied by a preexisting locked symbol, and wherein the locked value-bearing symbols remain fixed within respective symbol positions of the symbol position subset for outcome animation sequences of any subsequent feature game outcomes of the plurality of feature game outcomes;

in response to detecting a first subset of the plurality of symbol position subsets reaching a respective award threshold of locked value-bearing symbols, initiating, by the game-logic circuitry, an outcome counter;

in response to subsequently detecting a second subset of the plurality of symbol position subsets reaching a respective award threshold of locked value-bearing symbols prior to the outcome counter reaching a termination value, resetting, by the game-logic circuitry, the outcome counter to a reset value; and in response to the outcome counter reaching the termination value, concluding, by the presentation assembly, the plurality of feature game outcomes and animating an award sequence for any awarding subsets of the plurality of symbol position subsets that reached the respective award thresholds, wherein an aggregated award of the award sequence is at least partially a function of the award values of the locked value-bearing symbols of the awarding subsets.

9. The method of claim 8, wherein, for each feature game outcome of the plurality of feature game outcomes, each symbol position of the plurality of additional symbol positions is populated with a respective locked symbol, an inactive symbol, or a blank.

10. The method of claim 8, wherein any new symbols for each feature game outcome of the plurality of feature game outcomes are limited to populating the base set of symbol positions prior to locking any symbols.

11. The method of claim 8, wherein the first subset includes at least one symbol position each from the base set of symbol positions and the plurality of additional symbol positions.

12. The method of claim 8, wherein presenting the expanded set of symbol positions includes expanding columns of a base symbol array formed by the base set of symbol positions with the plurality of additional symbol positions.

13. The method of claim 12, wherein each column of the base symbol array is expanded a variable height based on one or more of a random determination or the feature trigger event.

14. The method of claim 8, wherein animating the respective set of symbols to occupy unlocked symbol positions of the symbol array includes causing, by the presentation assembly, a reel-spin animation for at least the base set of symbol positions while the locked value-bearing symbols remain fixed within the respective symbol positions of the symbol position subset.

15. The method of claim 8 further comprising visually presenting, by the presentation assembly, the outcome counter within the graphical game interface; and in response to each feature game outcome of the plurality of feature game outcomes, visually updating, by the presentation assembly, the outcome counter within the graphical game interface.

16. A gaming system comprising:

a gaming machine comprising a presentation assembly configured to present a graphical game interface including a symbol array comprising at least a base set of symbol positions selectively populated with randomly selected symbols within respective game outcomes; and game-logic circuitry in communication with the presentation assembly, the game-logic circuitry configured to:

in response to detecting a feature trigger event within a base game outcome, cause the presentation assembly to present an expanded set of symbol positions including the base set of symbol positions and a plurality of additional symbol positions, wherein the expanded set of symbol positions includes a plurality of symbol position subsets, each symbol position subset of the plurality of symbol position subsets positionally corresponding to a respective column of the symbol array;

cause the presentation assembly to present a plurality of feature game outcomes by animating a respective set of symbols to occupy unlocked symbol positions of the symbol array, the plurality of feature game outcomes selectively including value-bearing symbols having award indicia that visibly indicate an award value associated with the respective value-bearing symbol;

in response to any value-bearing symbols detected within the plurality of feature game outcomes, cause the presentation assembly to lock the detected value-bearing symbols within the expanded set of symbol positions, wherein any value-bearing symbol occupying a respective column of the symbol array is locked within a highest symbol position of the respective symbol position subset that is unoccupied by a preexisting locked symbol, and wherein the locked value-bearing symbols remain fixed within respective symbol positions of the symbol position subset for outcome animation sequences of any subsequent feature game outcomes of the plurality of feature game outcomes;

in response to detecting a first subset of the plurality of symbol position subsets reaching a respective award threshold of locked value-bearing symbols, initiate an outcome counter;

in response to subsequently detecting a second subset of the plurality of symbol position subsets reaching a respective award threshold of locked value-bearing symbols prior to the outcome counter reaching a termination value, reset the outcome counter to a reset value; and in response to the outcome counter reaching the termination value, cause the presentation assembly to conclude the plurality of feature game outcomes and animate an award sequence for any awarding subsets of the plurality of symbol position subsets that reached the respective award thresholds, wherein an aggregated award of the award sequence is at least partially a function of the award values of the locked value-bearing symbols of the awarding subsets.

17. The gaming system of claim 16, wherein any new symbols for each feature game outcome of the plurality of feature game outcomes are limited to populating the base set of symbol positions prior to locking any symbols.

18. The gaming system of claim 17, wherein reaching the award threshold of the first subset includes locking value-bearing symbols within at least one symbol position of the base set, and wherein locking the value-bearing symbols within the at least one symbol position prior to reaching the award threshold reduces a number of symbol positions within the first subset available for new symbols in subsequent feature game outcomes.

19. The gaming system of claim 16, wherein presenting the expanded set of symbol positions includes expanding columns of a base symbol array formed by the base set of symbol positions with the plurality of additional symbol positions.

20. The gaming system of claim 16, wherein the award threshold of each subset of the position subsets is equal to a number of symbol positions within the respective column of the symbol array.

21. The gaming system of claim 16, wherein the feature trigger event includes one or more trigger symbols within the base game outcome, and wherein the game-logic circuitry is configured to cause the presentation assembly to animate a transition of the one or more trigger symbols from respective symbol positions within the base set of symbol positions to respective symbol positions within the expanded set of symbol positions as initial locked value-bearing symbols of the plurality of feature game outcomes.

22. The gaming system of claim 16, wherein animating the award sequence includes causing, by the presentation assembly, an aggregation animation that visually accumulates the award values of the locked value-bearing symbols of each awarding subset into the aggregated award.

* * * * *